US011032871B2

(12) United States Patent
Amin et al.

(10) Patent No.: US 11,032,871 B2
(45) Date of Patent: Jun. 8, 2021

(54) MANAGING SLEEP CYCLES IN A WIRELESS COMMUNICATIONS SYSTEM

(71) Applicant: Telefonaktiebolaget LM Ericsson (publ), Stockholm (SE)

(72) Inventors: Parth Amin, St Albans (GB); Nicklas Beijar, Kirkkonummi (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/320,766

(22) PCT Filed: Jul. 27, 2016

(86) PCT No.: PCT/EP2016/067958
§ 371 (c)(1),
(2) Date: Jan. 25, 2019

(87) PCT Pub. No.: WO2018/019375
PCT Pub. Date: Feb. 1, 2018

(65) Prior Publication Data
US 2019/0159281 A1 May 23, 2019

(51) Int. Cl.
*H04W 76/28* (2018.01)
*H04W 52/02* (2009.01)
*H04W 76/40* (2018.01)
*H04W 36/26* (2009.01)
(Continued)

(52) U.S. Cl.
CPC ........... *H04W 76/28* (2018.02); *H04W 36/26* (2013.01); *H04W 52/02* (2013.01); *H04W 52/0216* (2013.01); *H04W 52/0248* (2013.01); *H04W 76/40* (2018.02); *H04W 4/70* (2018.02); *H04W 36/24* (2013.01); *H04W 52/0206* (2013.01)

(58) Field of Classification Search
CPC ..................................................... H04W 76/28
See application file for complete search history.

(56) References Cited

U.S. PATENT DOCUMENTS

| 2009/0052361 A1* | 2/2009 | Cai ........................... H04L 1/18 370/311 |
| 2012/0207069 A1 | 8/2012 | Xu et al. |
| 2013/0212219 A1 | 8/2013 | Koskela et al. |

(Continued)

FOREIGN PATENT DOCUMENTS

| GB | 2483752 A | 3/2012 |
| WO | 2015 187068 A1 | 12/2015 |

OTHER PUBLICATIONS

International Search Report for International application No. PCT/EP2016/067958—dated Apr. 4, 2017.

*Primary Examiner* — Edan Orgad
*Assistant Examiner* — Won Tae C Kim
(74) *Attorney, Agent, or Firm* — Baker Botts, LLP

(57) ABSTRACT

A control entity in a wireless communications system obtains discontinuous reception information for a plurality of wireless terminals and configures one or more of said wireless terminals, based on the obtained discontinuous reception information, to harmonise the awake periods of the plurality of wireless terminals. The control entity determines a common reception period for the plurality of wireless terminals such that a broadcast or multicast transmission during the common reception period is received simultaneously by the wireless terminals.

23 Claims, 19 Drawing Sheets

(51) Int. Cl.
*H04W 4/70* (2018.01)
*H04W 36/24* (2009.01)

(56) References Cited

U.S. PATENT DOCUMENTS

| | | | |
|---|---|---|---|
| 2014/0105009 A1* | 4/2014 | Vos | H04W 4/70 370/230 |
| 2014/0287789 A1* | 9/2014 | Matsuoka | H04W 24/08 455/509 |
| 2015/0208311 A1* | 7/2015 | Lee | H04W 36/30 455/436 |
| 2015/0215867 A1 | 7/2015 | Choi et al. | |

* cited by examiner

MANAGING SLEEP CYCLES IN A WIRELESS COMMUNICATIONS SYSTEM

PRIORITY

This nonprovisional application is a U.S. National Stage Filing under 35 U.S.C. § 371 of International Patent Application Serial No. PCT/EP2016/067958 filed Jul. 27, 2016 and entitled "Managing Sleep Cycles In A Wireless Communications System" which is hereby incorporated by reference in its entirety.

TECHNICAL FIELD

The present application generally relates to the management of discontinuous reception operation of wireless devices in a wireless communications system.

BACKGROUND

Emerging radio access technologies for Internet of Things (IoT) are being developed to address the ever expanding market needs and use cases. This includes 3GPP Long Term Evolution (LTE) machine type communications (MTC), 3GPP narrowband IoT, IEEE 802.15.4, IEEE 802.11ah, IEEE 802.11 Low power Long Range (LPLR), Sigfox, LoRa, Bluetooth long range, Bluetooth mesh etc.

Typically, the communications system topology for a communications system supporting an IoT network 100, as depicted in FIG. 1, will consist of hundreds of wireless terminals comprising sensors 104, 105, 106 connected to a wireless gateway 102, 103 and many such wireless gateways further connected to a cloud based control entity 101. A wireless gateway 102, 103 is used to describe an access to the core network and may comprise a wireless access node such as a Universal Mobile Telecommunications System (UMTS) NodeB or Long Term Evolution (LTE) Enhanced NodeB (eNodeB) in 3GPP terminology or for example a WiFi WLAN access point in IEEE 802.11 terminology.

A typical IoT network is expected to serve several different use cases; for example, city-wide IoT network serving diverse sensors such as parking meters, lighting, water meters, and various transport related sensors. Each scenario has differences in requirements, in particular: the sleep cycle of the sensors, latency, throughput and so on. Sensors may have a battery lifetime of several years, enabled by the mechanisms to allow wireless terminals to sleep longer provided in various radio access technologies. For example, 'extended Discontinuous Reception' (eDRX) in 3GPP LTE machine type communications and 'unified scaling factor' to extend the Listen Interval in IEEE 802.11ah.

Multicast and broadcast transmissions may send data to several hundreds of sensors; either from the cloud, via the gateway; or from a control entity, via the gateway; or from the gateway itself. Various radio technologies such as IEEE 802.11 and 3GPP LTE offer mechanisms for the gateway to multicast traffic to several connected sensors, for example on the link layer. Similarly, there are mechanisms disclosed, for example in WO 2015/187068, where the cloud service multicasts traffic to multiple gateways on the management protocol layer.

However, multicast and broadcast traffic is generally not retransmitted when there is a transmission error. The reason for this is that there is no acknowledgement. Also, multicast traffic may be transmitted using the lowest possible transmission rate over the wireless medium, to improve the probability of the reception by the sensors. System information of the gateway (including serving frequencies, bandwidth, identity of the gateway, information about the neighboring gateways) is typically broadcasted, as it is relevant for all the sensors.

Control/data messages relevant for the groups of similar sensors within the gateway are typically multi-cast. This may include commands to 'switch on' a group of light actuators according to certain latency requirements (for example, within 200 ms) or commands to a group of water meter sensors to update the meter reading frequency.

Depending on the particular radio access technology the handling of listen intervals or DRX cycles varies considerably. The listen interval or DRX cycle is defined in this disclosure as the duration between the start of two listen periods. In IEEE 802.11 systems for example, each sensor device requests its listen interval individually. Methods have been disclosed to negotiate sleep cycle settings between base station and mobile station (U.S. Pat. No. 8,509,134 B2) to combine the modification of sleep cycles with the modification of a service flow to minimize signaling.

In IEEE 802.11 (Wi-Fi) systems enhancements to the Power Saving Mode (PSM) have been considered to enable the buffering of data at the Access Point (AP) while, the wireless terminal, known as a Station (STA), in the a sleep state. In order for the AP to know which STAs are in sleep state the STA sends a frame with the Power Management bit set indicating it enters the sleep mode for the number of beacon intervals indicated in the Listen Interval parameter in the association. US 2015/187068 includes alternative methods for controlling the listen interval between a STA (wireless terminal) and the AP (wireless gateway).

Multicast traffic to wireless terminals (STAs) served by a given wireless gateway means that the data is buffered at the wireless gateway for any device which is not in its listen state. Thus, the traffic is delayed in a wireless communications system if some of the sensors in that IoT network are sleeping. Such problems are highlighted in IEEE 801.11 contribution "IEEE 802.11 multicast properties", A Stephens (Intel Corporation), 2015-09-15 [IEEE 802.11 Document Number: 11-15-1161-02-0arc-802-11-multicast-properties].

U.S. Pat. No. 8,913,518 B2 discloses a method for coordinating DRX cycles of different serving base stations in an LTE system providing Carrier Aggregation so that a UE does not have to operate two separate DRX cycles when served by different cells provided by separate base stations.

SUMMARY

A first aspect of the disclosure provides a method for managing discontinuous reception operation in a communications system wherein the communications system comprises a plurality of wireless terminals. Each wireless terminal is supporting a discontinuous reception operation wherein each wireless terminal discontinuously receives data transmissions. The method further comprises obtaining discontinuous reception information for each of said wireless terminals. Based on the obtained discontinuous reception information, a discontinuous reception configuration is generated for one or more of said wireless terminals to produce a common reception period. The common reception period is a period during which the plurality of wireless terminals are able to receive a data transmission at the same time. The method further comprises signalling the discontinuous reception configuration for the one or more wireless terminals to produce the common reception period. The first aspect provides the advantage that it enables wireless terminals to be synchronised for their DRX or Power saving Mode which allows a control entity to better manage data transmissions and power saving cycles for wireless gateways such as an AP or base station. This first aspect enables a transmission to be received directly by a plurality of wireless terminals simultaneously rather than being buffered at a wireless gateway or not received by one or more wireless terminals.

The first aspect may further comprise causing a transmission of a multicast or broadcast transmission to the plurality of wireless terminals during the common reception period.

In a further example of the first aspect, the discontinuous reception information comprises one or more of: a reception period, a sleep period, a DRX cycle, and a DRX cycle start period; and the discontinuous reception configuration comprises modifying one or more of the reception period, the sleep period, the DRX cycle, and the DRX cycle start period.

In further example of the first aspect, the discontinuous reception information comprises an indication whether one or more of a reception period, a sleep period, a DRX cycle, and a DRX cycle start period can be modified. This allows the method to determine whether it is able to configure a preferred common reception period or whether the reception period may still be configured but to a less preferred period based on the reception periods of terminals which cannot be modified.

In another example of the first aspect the plurality of wireless terminals are served by multiple wireless gateways wherein one or more of the wireless gateways comprise different radio access technology. The system level broadcast or multicast transmission may therefore be performed to multiple devices independently of the Radio Access Type, RAT, i.e. it can be RAT agnostic.

In a further example the method may include obtaining discontinuous reception information and/or signalling discontinuous reception configuration by using a management control protocol such as Light Weight Machine to Machine (LWM2M) signalling. This allows a control entity to control and communicate with the terminals directly rather than via their respective wireless gateways.

In another example of the first aspect a wireless gateway supports discontinuous transmission, wherein the method further comprises generating a discontinuous transmission, DTX, schedule for the wireless gateway wherein the discontinuous transmission schedule is synchronized with the common reception period. The example includes indicating the DTX schedule to the wireless gateway. The example allows a control entity to configure the wireless gateway to sleep when no transmission can be received by a wireless terminal and thus reduce operating power of the wireless gateway.

In another example of the first aspect the method further comprises selecting a wireless terminal which is unable to receive a transmission during a first common reception period associated with a first wireless gateway. The method further involves obtaining connectivity information for said wireless terminal, wherein the connectivity information identifies one or more wireless gateway to which the wireless terminal can connect. The method then comprises identifying a second wireless gateway for which the wireless terminal is able to receive a transmission during a second common reception period associated with the second wireless gateway and initiating a handover of said wireless terminal from the first wireless gateway to the second wireless gateway. This allows a control entity to separate devices with common reception periods and for them to be grouped within the same wireless gateway/base station or set of base stations, if no single common reception period can be configured. By doing this buffering in each wireless gateway can be avoided or reduced, broadcasts can be coordinated at base station (group of base station) granularity. Wireless devices can thus be controlled in a synchronised manner at wireless gateway level.

In another example, the method may further comprise causing a transmission of the multicast or broadcast transmission to the plurality of wireless terminals during the first common reception period and the second common reception period. This provides the advantage that all wireless terminals served by the same wireless gateway receive broadcasts/multicasts simultaneously and a control entity performing the transmission can minimise the number of wireless terminals receiving the broadcast at different time periods.

A second aspect of the disclosure provides a control entity for use in a communications system wherein the communications system comprises a plurality of wireless terminals each supporting a discontinuous reception operation wherein each wireless terminal discontinuously receives data transmissions. The control entity is configured to obtain discontinuous reception information for each of said wireless terminals and to generate, based on the obtained discontinuous reception information, a discontinuous reception configuration for one or more of said wireless terminals to produce a common reception period. The common reception period is a period during which the plurality of wireless terminals are able to receive a data transmission at the same time. The control entity is further configured to signal the discontinuous reception configuration for the one or more wireless terminals to produce the common reception period.

In a third aspect of the disclosure a method of discontinuous reception operation in a wireless terminal in a communications system is provided. The communication system comprising a plurality of wireless terminals. The method comprises reporting discontinuous reception information. The method further comprises receiving a discontinuous reception configuration wherein the discontinuous reception configuration produces a common reception period for the plurality of wireless terminals. The method includes adapting the discontinuous reception operation based on the received discontinuous reception configuration.

In a fourth aspect of the disclosure a wireless terminal for use in a communications system, wherein the communications system is comprised of a plurality of wireless terminals is provided. The wireless terminal is configured to support a discontinuous reception operation wherein the wireless terminal receives data transmissions discontinuously. The wireless terminal is further configured to report discontinuous reception information and receive a discontinuous reception configuration wherein the discontinuous reception configuration produces a common reception period for the plurality of wireless terminals. The wireless terminal is further configured to adapt the discontinuous reception operation based on the received discontinuous reception configuration.

In fifth aspect of the disclosure a control entity comprises a discontinuous reception information module for obtaining discontinuous reception information for a plurality of wireless terminals. The control entity is further comprised of a discontinuous reception configuration module for generating, based on the obtained discontinuous reception information, a discontinuous reception configuration for one or more of said wireless terminals to produce a common reception period, wherein the common reception period is a period during which the plurality of wireless terminals are able to receive a data transmission at the same time. The control entity further comprises an interface module for signalling the discontinuous reception configuration for the one or more wireless terminals to produce the common reception period. In further examples the control entity may comprise a broadcast/multicast module for broadcasting or multicasting a transmission to the plurality of wireless terminals during the common reception period. In another example of the fifth aspect, the control entity comprises a handover module for initiating a handover of a wireless terminal which is unable to receive a transmission during a first common reception period associated with a first wireless gateway. The handover module is configured to select a wireless terminal which is unable to receive a transmission during a first common reception period associated with a first wireless gateway. The handover module is further configured to obtain connectivity information for said wireless terminal, wherein the connectivity information identifies one or more wireless gateway to which the wireless terminal can connect. The handover module is further configured to identify a second wireless gateway for which the wireless terminal is able to receive a transmission during a second common reception period associated with the second wireless gateway; and to initiate a handover of said wireless terminal from the first wireless gateway to the second wireless gateway.

In a sixth aspect of the disclosure a wireless terminal is provided, comprising a discontinuous reception information reporting module for reporting discontinuous reception information and discontinuous reception configuration module for receiving a discontinuous reception configuration wherein the discontinuous reception configuration produces a common reception period for the plurality of wireless terminals. The discontinuous reception configuration module includes adapting the discontinuous reception operation based on the received discontinuous reception configuration.

In a seventh aspect of the disclosure a computer program is configured, such that when run on a computer, the computer program carries out a method according to any of the examples disclosed herein.

In an eighth aspect of the disclosure a carrier containing a computer program comprising instructions is provided which, when executed on at least one processor, cause the at least one processor to carry out the method according to any one of the examples disclosed herein.

In a ninth aspect of the disclosure a control entity for managing discontinuous reception operation in a communications system is provided. The communications system comprising a plurality of wireless terminals each supporting a discontinuous reception operation wherein each wireless terminal discontinuously receives data transmissions. The control entity further comprises a processor and a memory, said memory containing instructions executable by said processor whereby said control entity is operative to obtain discontinuous reception information for each of said wireless terminals; generate, based on the obtained discontinuous reception information, a discontinuous reception configuration for one or more of said wireless terminals to produce a common reception period. The common reception period is a period during which the plurality of wireless terminals are able to receive a data transmission at the same time. The control entity is further configured to signal the discontinuous reception configuration for the one or more wireless terminals to produce the common reception period.

In a tenth aspect of the disclosure a wireless terminal is provided, comprising a processor and a memory, said memory containing instructions executable by said processor whereby said wireless terminal is operative to report discontinuous reception information; and to receive a discontinuous reception configuration wherein the discontinuous reception configuration produces a common reception period for a plurality of wireless terminals. The terminal is further operable to adapt a discontinuous reception operation based on the received discontinuous reception configuration.

BRIEF DESCRIPTION OF THE DRAWINGS

Embodiments of the present disclosure will now be described, by way of example only, with reference to the accompanying drawings in which.

DETAILED DESCRIPTION

Figure 1:
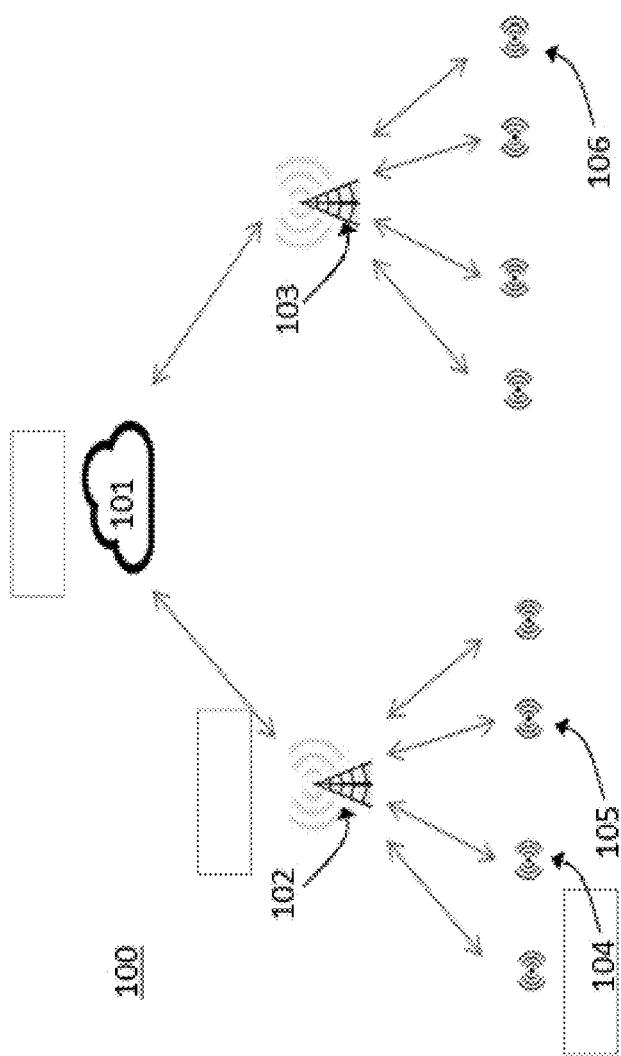
FIG. 1 shows an example of a cloud based service communicating with multiple IoT devices served by multiple base stations according to the prior art.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

A communications system is disclosed comprising a plurality of wireless terminals, each supporting a discontinuous reception operation wherein each wireless terminal discontinuously receives data transmissions. Said communications system may further comprise a plurality of network nodes or entities providing, for example, the functions required to provide connectivity, management and deliver services to the plurality of wireless terminals. A control entity may be a logical function within one or more nodes or entities of the communications system which provides a certain control function. A wireless gateway may also be termed an entity of the communications system. The communications system may be comprised in a cloud computing environment, wherein one or more entities are based in the cloud. In some examples a control entity may reside in a wireless terminal and/or a wireless gateway.

Figure 2:
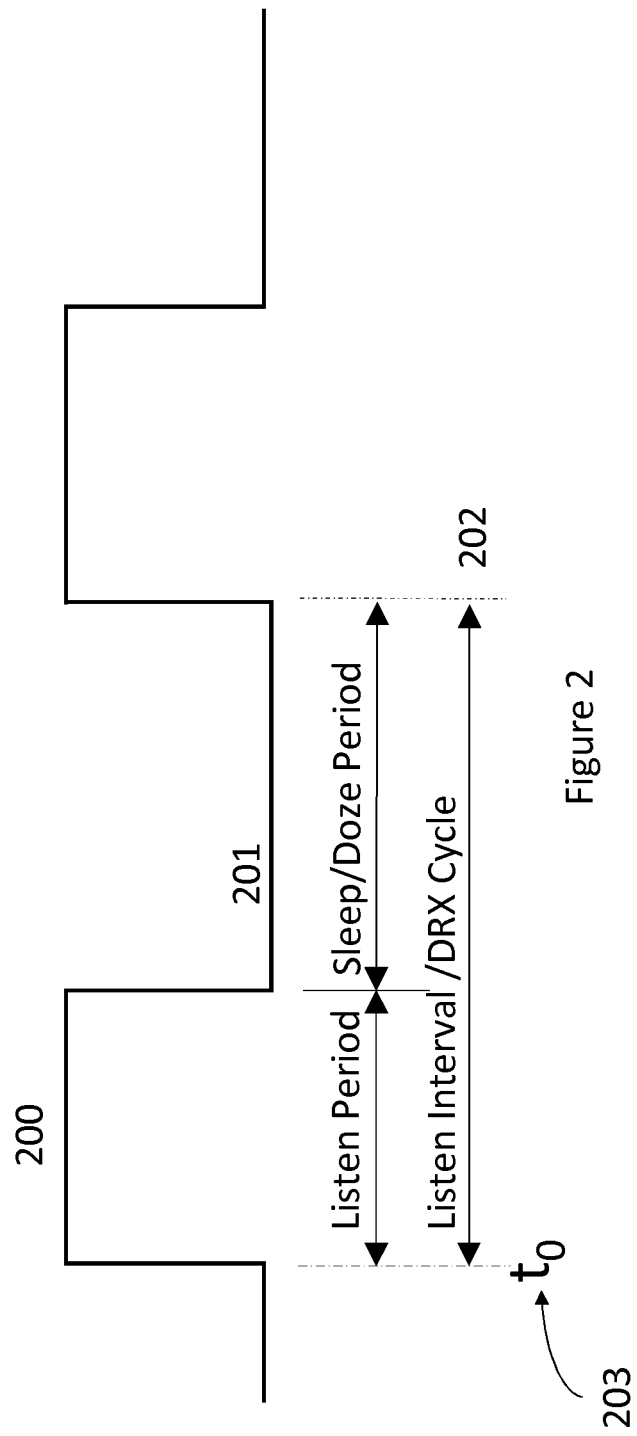
FIG. 2 shows an example representation of a DRX Cycle.

Discontinuous reception is a means to provide power saving and as such may be termed a power saving mode (PSM) of operation. Such a power saving mode may comprises listen periods, and non-listen periods wherein the wireless device may be in a sleep state or doze state. The terminology for sleep periods, awake periods, sleep cycles, discontinuous reception (DRX) cycles varies depending on the technology or standards forum defining the technologies. In order to discuss the concepts at a general level FIG. 2 depicts the basic concepts, wherein the term listen interval or DRX cycle 202 is used to describe the duration between the start of consecutive listen periods; the term listen period 200 or reception period is used to describe the awake period; and the sleep period 201 is the term used to describe the period between awake periods or reception periods. The reception period is the term used to describe when the wireless receiver is powered on and is able to detect downlink transmissions such as paging. In this disclosure the term discontinuous reception information is used to describe one or more parameters which may define the DRX cycle or listen interval. In a connected mode this may also include uplink transmissions. In some examples the sleep period, also known as the doze period, is when the wireless device does not expect any transmissions and can save power through varying processes which may include powering down transceivers and baseband processing circuitry. The terms so used are to illustrate and clarify the embodiments, other terms and definitions for describing a discontinuous reception operation are envisaged without deviating from the aspects of the disclosure. Each DRX Cycle 202 has a start period which is denoted as $t_0$ 203. The start of the DRX cycle may be indicated in real time or more often relative time with respect to a known aspect of the radio transmission signalling. In some examples the start of the DRX cycle 202 is a relative offset to the sub-frame. In some examples the start of the DRX cycle is a function of the Sub-Frame Number (SFN) such that the wireless terminal starts its DRX cycle in a sub-frame which satisfies the function based on received configuration data. In other examples the DRX cycle start period, $t_0$ 203, is a function of a beacon interval wherein a beacon is a signal transmitted periodically from an AP. In some examples the beacon interval is based on the local time stamp of the AP.

The wireless gateway must be awake when any of the wireless devices connected to the wireless gateway is awake. Therefore, if there are varying awake times for served wireless devices, the wireless gateway must be awake long enough to cover all served wireless devices' awake times. In some examples the awake period of a wireless gateway is termed the transmission period. In some examples a wireless gateway which operates a sleep-transmission cycle is said to operate in discontinuous transmission or DTX mode.

The term wireless terminal is used to describe a wireless device operable in a wireless communications system. Typically a wireless terminal comprises a transceiver further comprising one or more antennas providing a means to send and receive communications to/from the communications system via one or more wireless gateways. In some examples a wireless terminal comprises one or more sensors. In some examples the wireless terminal may have one sensor and one DRX cycle associated to the sensor. In other examples the wireless terminal may have multiple sensors and can have one or more DRX cycles. In some examples such a wireless terminal may have a separate DRX cycle for each sensor. Whilst the present disclosure refers to a wireless device herein as a wireless terminal, other terms for a wireless device such as a User Equipment, UE; Station, STA; FDA; laptop PC; apply equally and may be used according to one or more of the disclosed embodiments.

Figure 3:
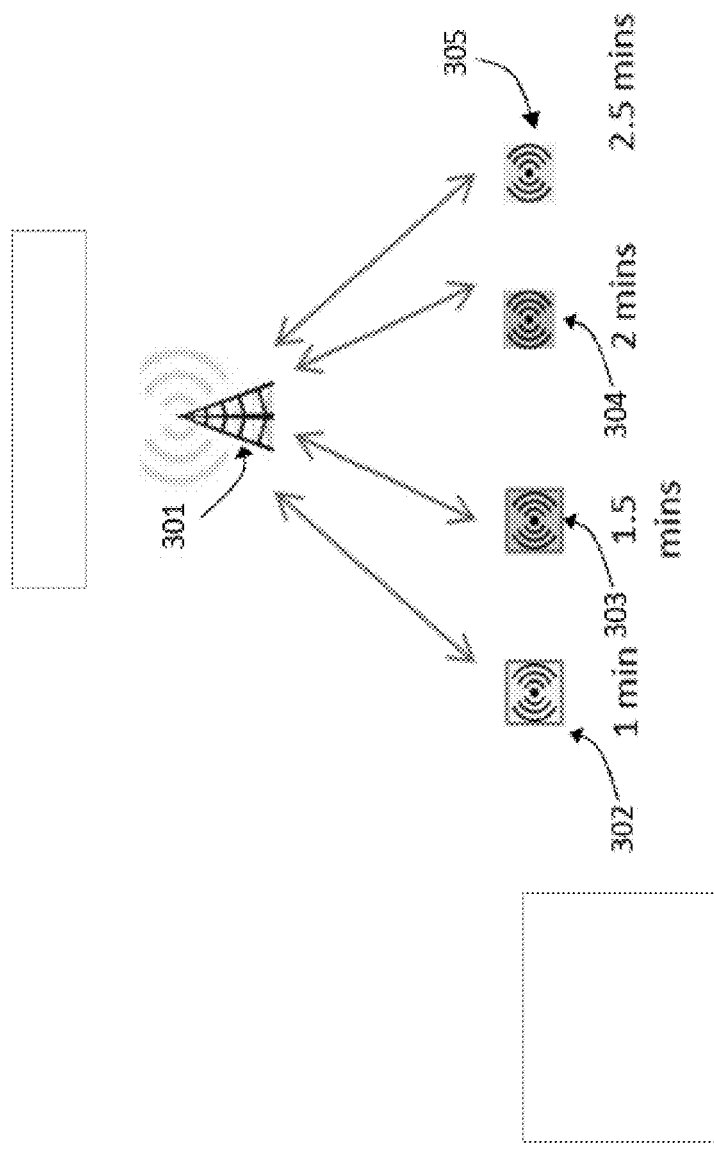
FIG. 3 shows an example wireless access node serving multiple wireless devices with differing listen intervals according to the prior art.

FIG. 3 depicts the case, where a gateway 301 wishes to schedule the multicast transmissions across wireless terminals, which have differences in their sleeping patterns i.e. the wireless terminals are to wake up every 1 min 302, 1.5 minutes 303, 2 minutes 304 and 2.5 minutes 305. The only time all receivers are awake occurs at 30 minute intervals. Sensor 303 wakes up at times 0, 1.5, 3, 4.5, 6, 7.5, 9, 10.5, 12, 13.5, 15, 16.5, 18, 19.5, 21, 22.5, 24, 25.5, 27, 28.5, 30. Sensor 305 wakes up at times 0, 2.5, 5, 7.5, 10, 12.5, 15, 17.5, 20, 22.5, 25, 27.5, 30. Sensor 304 wakes up on even minutes and sensor 302 wakes up every minute. So the first time every sensor is awake is after 30 minutes.

Figure 4:
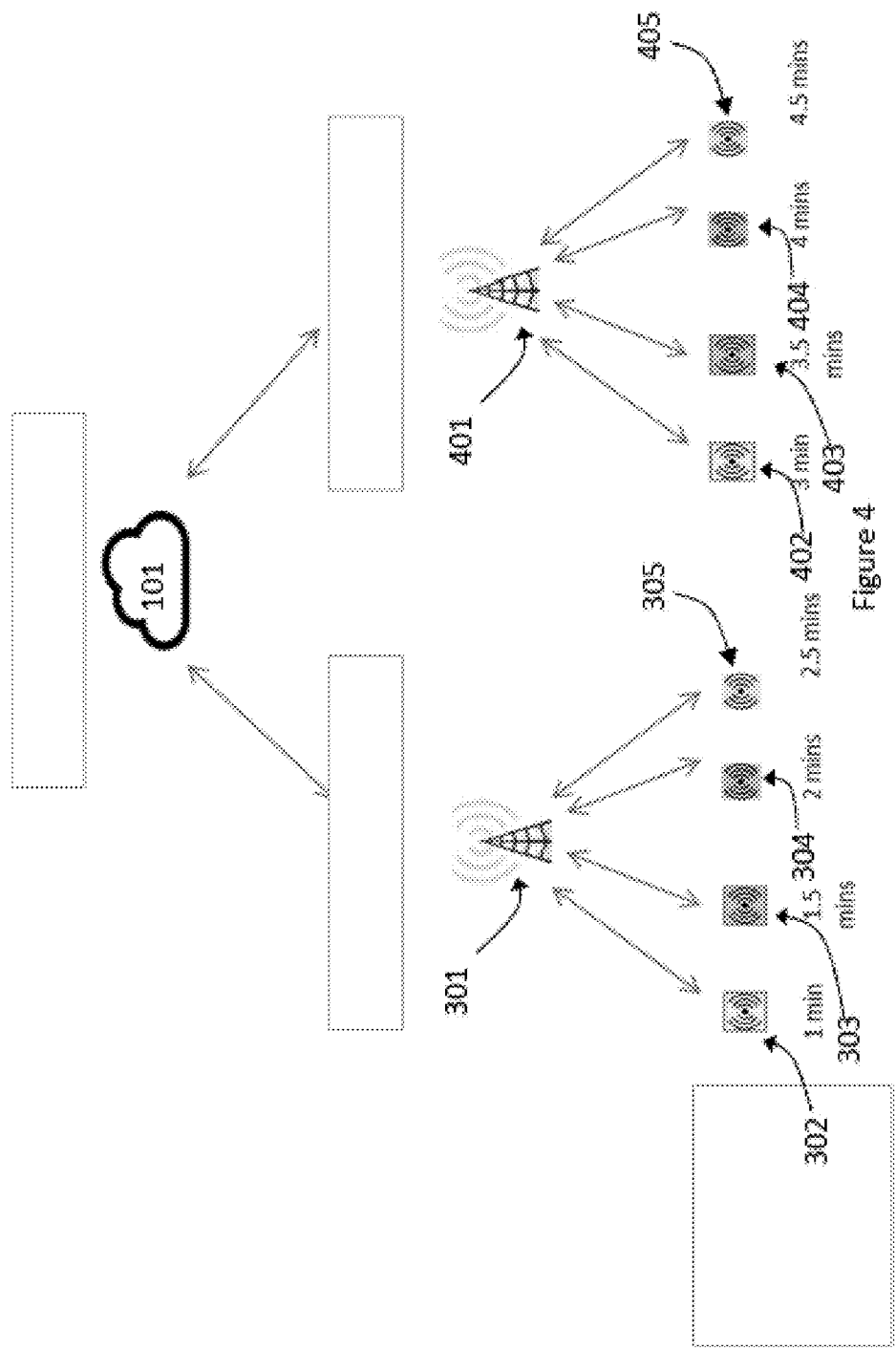
FIG. 4 shows an example cloud based service serving multiple wireless access nodes serving multiple wireless devices with differing listen intervals according to the prior art.

FIG. 4 depicts the case, where a cloud based control entity 101 wishes to schedule the multicast transmissions across a plurality of wireless terminals 302 to 305, 402 to 405 which have differences in their DRX cycles and are also connected to multiple wireless gateways. The problem of multicast scheduling from the cloud based control entity 101 becomes an additional problem when the gateways have their own, different, DRX or DTX cycles i.e. gateways are not awake all the time.

Figure 5:
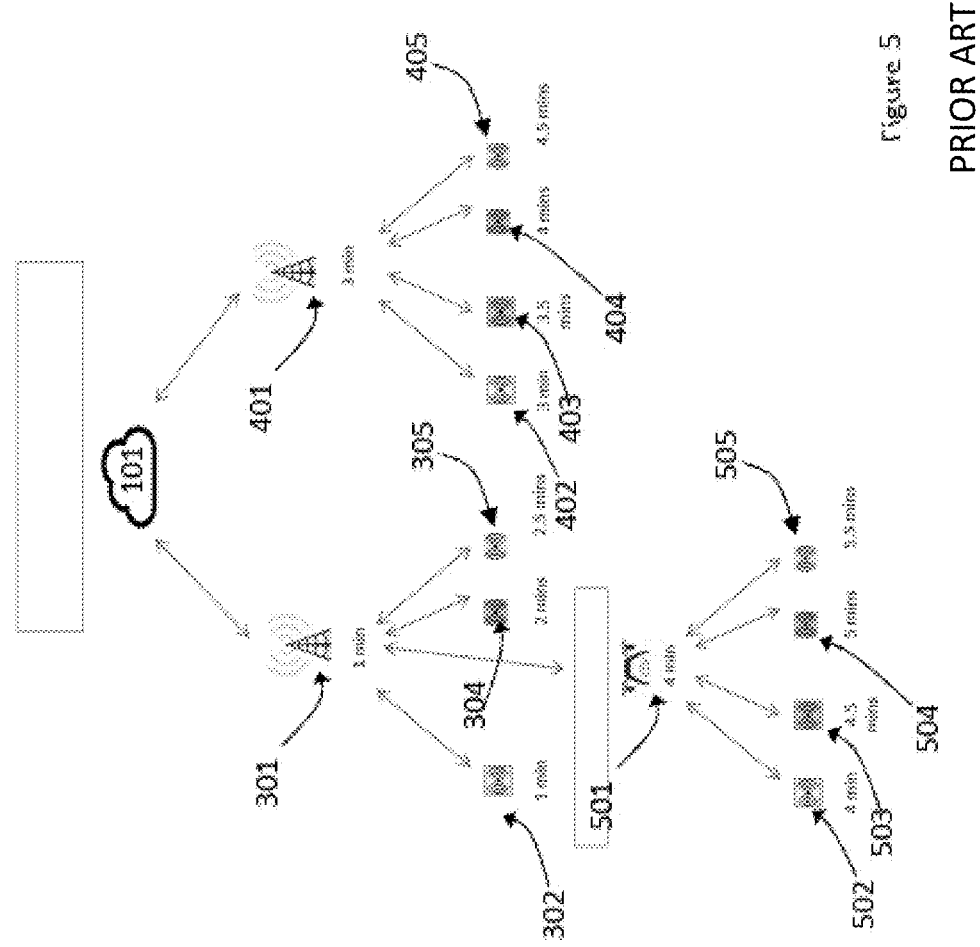
FIG. 5 shows an example cloud based service serving multiple wireless access nodes serving multiple wireless devices with differing listen intervals including relay nodes serving multiple wireless devices with differing listen intervals according to the prior art.

FIG. 5 depicts a multi-hop or relay network, where a relay node 501 serves multiple wireless terminals and is connected to a wireless gateway 301 at the backhaul. In some examples differences in the listen intervals may occur between the wireless terminal 502, 503, 504, 505, relay nodes 501 and wireless gateways 301.

In order to overcome some of the problems described in one or more embodiments one or more of a plurality of wireless terminals, to which a multicast or broadcast transmission may be performed, are configured to produce a common reception period such that each of the plurality of wireless terminals is awake for a common time period.

Methods and apparatus are disclosed for adapting the DRX cycles of wireless terminals and/or the transmission cycles of wireless gateways and relay nodes to enable broadcast transmissions and/or multicast transmissions to be performed to a plurality of wireless terminals. In some examples the wireless terminals are part of an IoT sensor network. In some examples the sensors comprised within the wireless terminals have long listen intervals. In some examples the DRX cycles and/or DRX cycle start periods vary between one or more of the wireless terminals to which the broadcast or multicast transmission is to be performed.

Figure 6:
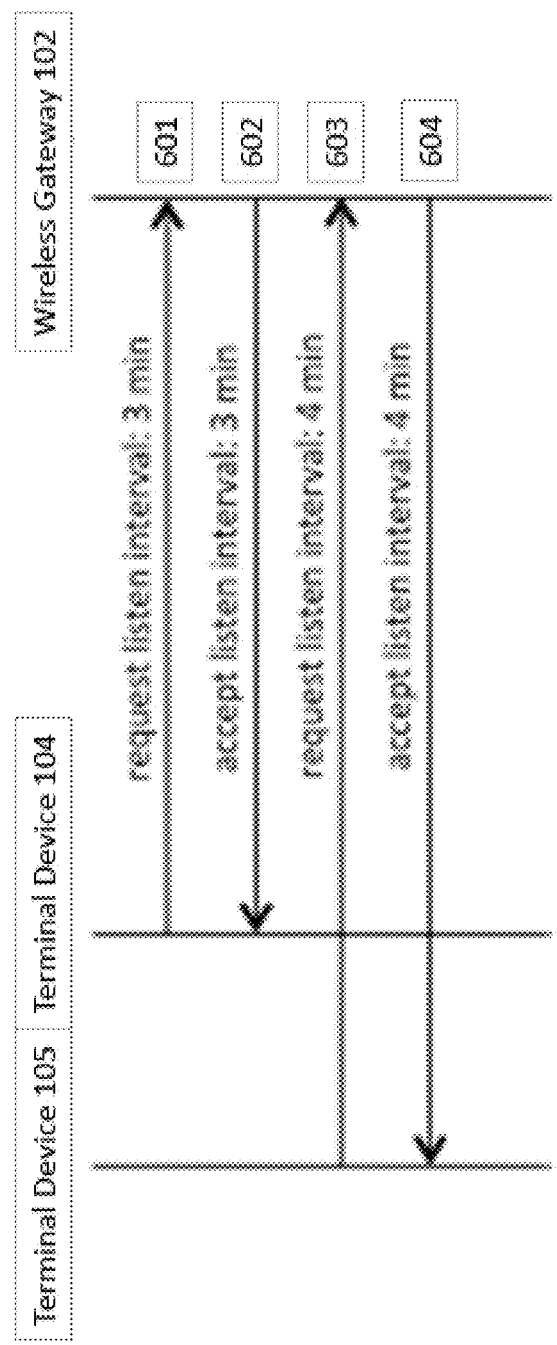
FIG. 6 shows an example flow for UE/STA requested listen interval setting or modification according to the prior art.

In one embodiment a control entity in a communications system obtains discontinuous reception information for each wireless terminal to which a broadcast or multicast is to be performed. In some examples the discontinuous reception information is obtained from the wireless gateway to which the wireless terminal is attached. In some examples the wireless gateway is aware of the wireless terminal discontinuous reception information due to an earlier signalling request from the wireless terminal. An example of such a signalling sequence is shown in FIG. 6. In FIG. 6, a wireless terminal 104 requests 601 a listen interval, indicating the listen interval duration. In other examples the discontinuous reception information comprises one or more of: a reception period; a sleep period; a DRX cycle or listen interval; and a DRX cycle start period, $t_0$. In the example in FIG. 6, the wireless gateway 102 accepts 602 the requested listen interval and responds to the wireless terminal. The wireless gateway may receive similar requests from other connected wireless terminals 105 requesting 603 a different listen interval (or other discontinuous reception information). The wireless gateway 102 accepting 604 such requests by responding to the wireless terminal 105. In some examples the discontinuous reception information is retrieved from the wireless terminal by the wireless gateway. In other examples the control entity may obtain the discontinuous reception information directly from the wireless terminal. In some examples the discontinuous reception information is retrieved via a standardised protocol interface, for example via a radio access type protocol such as a Medium Access Control (MAC) protocol; a Radio Resource Control (RRC) protocol; a Non-Access Stratum (NAS) protocol such as LTE-Uu interface or an IoT or machine type communication specific protocol such as Light Weight Machine-to-Machine (LWM2M) protocol. In some implementations the retrieval of discontinuous reception information is via a combination of protocols, for example MAC protocol between the wireless terminal and wireless gateway and LWM2M between the wireless gateway and the LIM.

Figure 7:
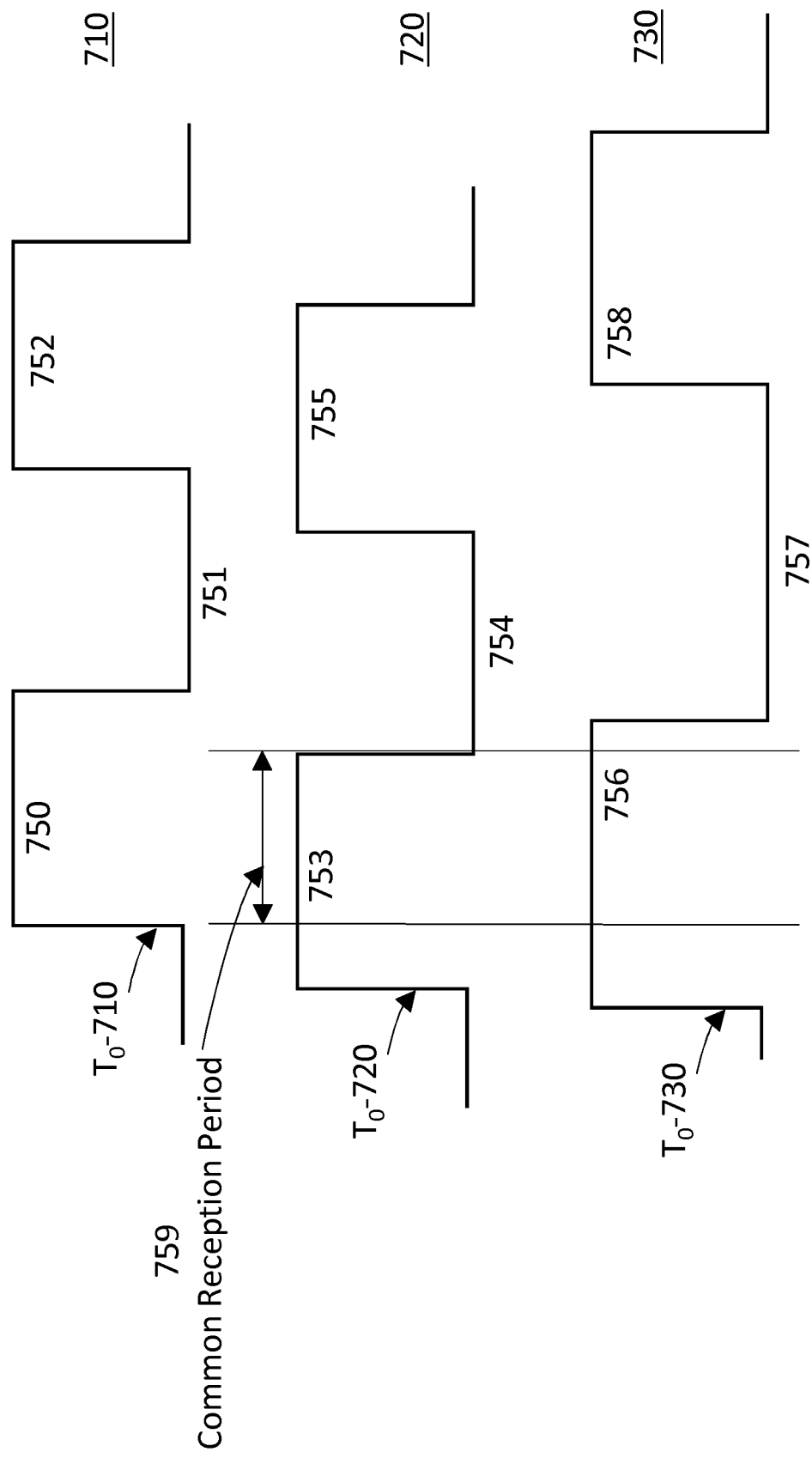
FIG. 7 shows an example set of DRX cycles according to an example embodiment disclosed herein.

Some examples include a control entity named a Listen Interval Manager (LIM). The LIM may be a cloud based entity. In other examples the LIM is a logical entity within a communications system node or device such as a wireless gateway, router or other device. In some examples the LIM may be a distributed function over multiple nodes or devices. The LIM is one kind of control entity, wherein such a control entity may determine that a common reception period exists as depicted in FIG. 7. In FIG. 7, the DRX cycles of 3 wireless terminals, 710, 720 and 730 wherein, each DRX cycle may have a different DRX cycle start period, $T_0$-710, $T_0$-720, $T_0$-730; different listen periods, 750, 752, 753, 755, 756, 758; and/or different listen intervals, 751, 754, 757; In FIG. 7 a common reception period is determined by the control entity as being the period 759. If the broadcast or multicast can be transmitted during such a common reception period the control entity proceeds to cause the transmission to be performed. In some examples the control entity may perform the transmission itself. In other examples the control entity indicates to a higher layer application, for example a cloud based utility control application such as a smart grid.

Aspects of the disclosure comprise a means to manage the listen periods of the wireless terminals to which the broadcast or multicast transmission is to be performed, to enable the transmission to occur directly, without buffering. In some aspects the amount of buffering required is reduced and thus data storage and processing is reduced. In some embodiments the control entity configures the discontinuous reception information of one or more wireless terminals when no common reception period is determined on the first assessment. In some examples the duration of the reception period is adapted, whereas in other examples the duration of the DRX cycle or listen interval is adapted. In some examples only the DRX cycle start period is adapted. In other examples one or more of the reception period, the listen interval or DRX cycle and the DRX cycle start period are adapted. A specific aspect of the DRX cycle may thus be configured, for example, in relation to IEEE 802.11 PSM terminology the Listen Interval parameter which governs the DRX cycle for wi-fi devices and therefore a control entity is able to adjust a certain DRX parameter to produce a common reception period.

Figure 8:
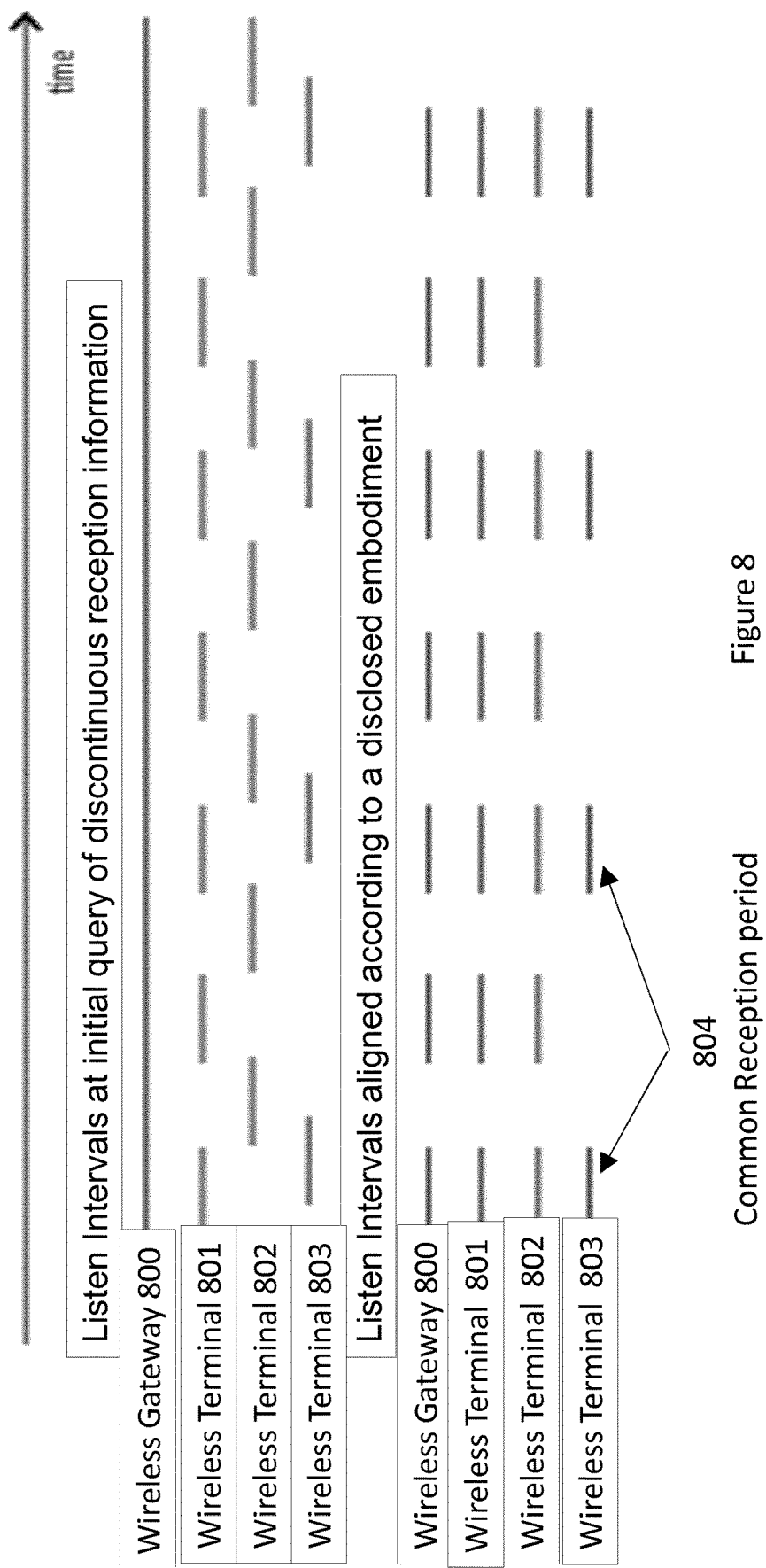
FIG. 8 shows an example comparison of the listen intervals in the state of the art and an embodiment disclosed in the present application.

In FIG. 8 a wireless gateway 800 is serving a plurality of wireless terminals 801, 802, 803, wherein the wireless gateway 800 has obtained the discontinuous reception information for each wireless terminal. In FIG. 8 the reception period is depicted by a solid line and the listen interval as a break between solid lines. The respective discontinuous reception information indicates that wireless terminal 801 and wireless terminal 802 are configured with the same listen interval but the DRX cycle start time is not aligned and thus they wake up at different times. This means there is no common reception period between wireless terminal 801 and wireless terminal 802. Wireless terminal 803 is configured with a longer listen interval but again the DRX cycle start time is not aligned with wireless terminal 801 or 802 which means that although there is partial overlap of listen periods between wireless terminal 803 and 801 and partial overlap of listen periods between wireless terminal 803 and 802 there is no common reception period between all of the wireless terminals served by the wireless gateway 800. FIG. 8 subsequently depicts the DRX cycles of the wireless terminals after alignment according to an embodiment of the disclosure wherein the DRX cycle start period of wireless terminals 802 and 803 is reconfigured such that each wireless terminal has an aligned listen period or common reception period 804. In some examples the DRX cycle start period is reconfigured by adjusting the accepted listen interval wherein a listen interval is based on a number of beacon frames such that the wireless gateway or AP reduces the accepted listen interval until all wireless terminals are starting at the same beacon frame. In some examples the listen interval may be reduced down to one beacon frame interval. In other examples the DRX cycle start period may be reconfigured by adapting an offset, wherein the listen interval is not reduced but simply delayed. In some examples the offset may comprise an integer number of radio subframes or beacon frames.

An advantage achieved by the aforementioned embodiments is that the wireless gateway can perform a broadcast or multicast transmission to all of the served wireless terminals. As a result the wireless gateway does not need to buffer transmissions to any of the served wireless terminals. Thus a higher layer, for example a cloud service or application can transmit broadcast or multicast transmissions to all served wireless terminals simultaneously. Additionally, the latency from the sender to the served wireless terminal may be reduced.

Figure 9:
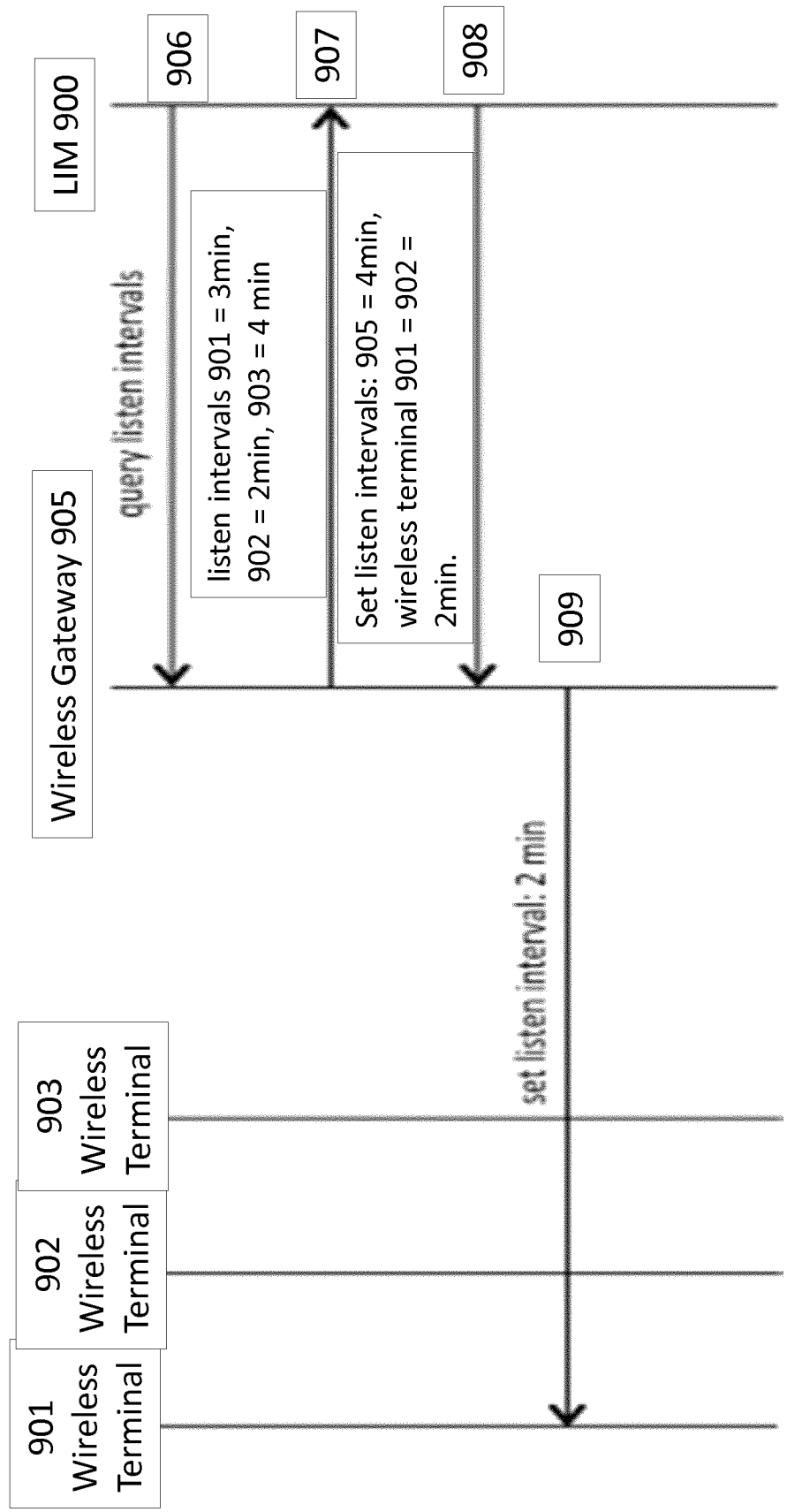
FIG. 9 shows an example signalling sequence according to an embodiment disclosed in the present application.

In some examples the control entity may adjust the beacon interval or transmission period for a multicast or broadcast transmission instead of, or as well as re-configuring the DRX cycle parameters of one or more wireless terminal served by the wireless gateway. FIG. 9 depicts an example signalling sequence wherein a LIM 900 obtains the discontinuous reception information of wireless terminals 901, 902, 903 by sending a query listen intervals message to wireless gateway 905. The LIM 900 retrieves the listen intervals of the wireless terminals in response signal 907 and determines a common listen interval (in this case intervals evenly divided by 4 min) for all wireless terminals. The listen interval of wireless terminal 901 is reduced from 3 min to 2 min. The listen intervals of wireless terminals 902 and 903 are not changed. The listen interval of wireless terminal 903 is a multiple of the listen interval of the other two wireless terminals. The wireless gateway 905 is configured to support a listen interval of 4 min, in other words if it is to a perform broadcast or multicast transmissions wireless gateway 905 performs this during the common reception period comprising listen intervals of 4 min, when all wireless terminals are simultaneously awake. The LIM conveys the listen interval configuration to the wireless device 901 and the wireless gateway 905, in this example, via the wireless gateway 905 in signal 908.

The alignment procedures described thus far are described for a single wireless gateway level, however as indicated previously it is an aspect of the disclosure that the control entity may perform the configuration for many wireless terminals served via a plurality of wireless gateways and relay nodes. In some examples the plurality of wireless gateways and relay nodes comprise multiple radio access types and therefore the procedures for configuring the wireless terminals to align their discontinuous reception information to produce a common reception period may vary between radio access technology. As described previously this may entail specific protocol procedures between wireless terminal and wireless gateway. In a some examples the wireless terminals support a common unified protocol interface such as LWM2M. Such a common protocol interface enables the control entity to directly align the wireless terminals with common procedures despite the wireless terminals operating towards different radio access technologies.

In another aspect of the disclosure the control entity obtains discontinuous reception information which includes whether or not certain parameters can be configured, for example the DRX cycle may be reconfigured but the reception period is fixed. In some examples the control entity uses the management protocol to retrieve the information about the wireless terminals. In some examples the control entity retrieves the preferred DRX cycles of all managed wireless terminals using the methods provided by the management protocol (e.g. observe/notify in LWM2M). In some examples the discontinuous reception information includes the extent to which the certain parameters can be adapted, for example the allowed range (maximum, minimum interval) of such an adjustment. In some examples the listen interval may have a fixed range of m to n beacon frames or the reception period has a maximum duration. In some embodiments the control entity determines that a wireless terminal cannot be aligned with the other wireless terminals with which it shares the same wireless gateway. In some examples the wireless terminal cannot be aligned because the value of the parameter which needs to be re-configured would be out of range of that supported by the wireless terminal. In other examples the wireless terminal cannot be aligned because the parameter which the control entity requires to be adapted is not permitted to be reconfigured in the wireless terminal.

In some examples more than one common reception period is generated, such that not all served wireless terminals can receive a multicast or broadcast transmission at the same time, however through the configuration of discontinuous reception parameters of wireless terminals where possible the number of common reception periods is minimised. There is still an advantage that buffering may be reduced, thus saving data storage resources and processing resources. In some examples multicast transmissions may be performed independently for each of the groups of wireless terminals which share a common reception period.

In some examples the control entity may determine that a wireless terminal can be aligned with other wireless terminals served by another wireless gateway which is in range of the wireless terminal in question. In some examples the control entity obtains the information of which wireless gateways the wireless terminal is within range and can attach to, directly via a management protocol such as LWM2M. In other examples the control entity obtains such information from other control entities in a management layer of the communications system, such as a LWM2M server. In other examples the control entity obtains this information from the wireless gateways.

Figure 10:
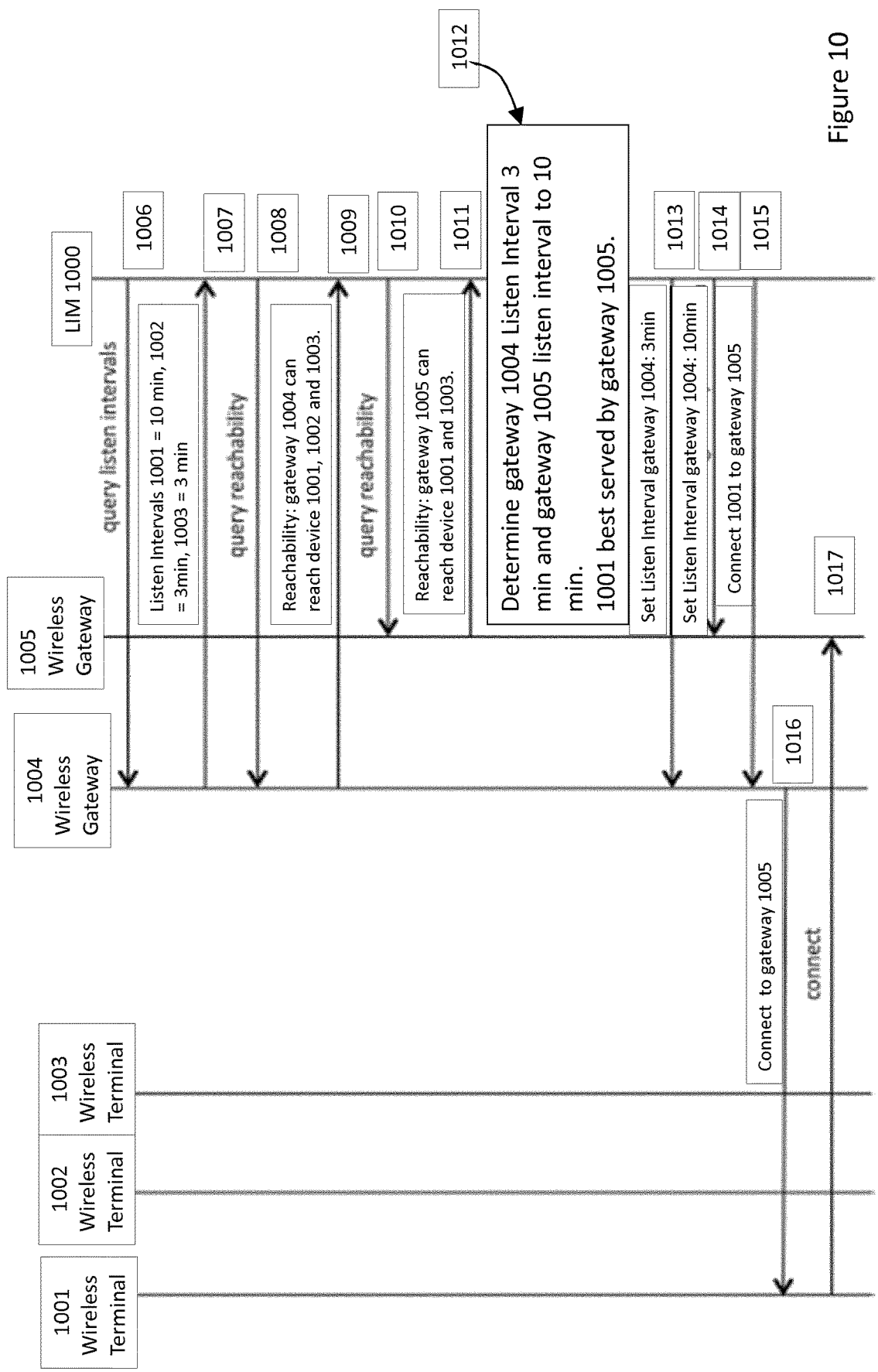
FIG. 10 shows an example signalling sequence according to another embodiment disclosed in the present application.

This information enables the control entity to determine whether another wireless gateway could better serve the wireless terminal, i.e. if there is a common reception period which can be configured for all served wireless terminals including the wireless terminal in question. In some aspects of the disclosure the control entity initiates a handover of one or more wireless terminals from a wireless gateway with which the wireless terminal is currently served to another wireless gateway in order to align wireless terminal listen or reception periods to enable a multicast or broadcast transmission to be performed simultaneously to all wireless terminals served by the wireless gateway. FIG. 10 shows a LIM 1000 which sends a request to query the listen intervals 1006 to a first wireless gateway 1004. The LIM 1000 receives the discontinuous reception information in response 1008. In this example the LIM 1000 requests the connectivity information from the first wireless gateway 1004 with a query reachability message 1008. The wireless gateway 1004 returns indications of which wireless terminals can connect, i.e. are within range and are permitted to connect, with which wireless gateways in response 1009. In the example the LIM performs a second connectivity information request 10010, to a second wireless gateway 1005, receiving in response 1011 the wireless terminals which can be connected to the second wireless gateway 1005. In other examples the connectivity information may be obtained from the wireless terminals. In other examples the LIM may obtain this information from another control entity or database. The LIM can then determine which wireless gateways are optimal to serve which wireless terminals such that the listen intervals can be synchronised. In this example the LIM determines 1012 the first wireless gateway 1004 common listen interval to be 3 min and that wireless terminal 1001 is best served by the second wireless gateway 1005. The LIM sends a configuration signal 1013 to set the first wireless gateway listen interval to 3 min. In this example the LIM also instructs the first wireless gateway 1004 to hand over wireless terminal 1001 to wireless gateway 1005 since the requirement of wireless terminal 1001 matches better the listen interval of the second wireless gateway 1005.

Figure 11:
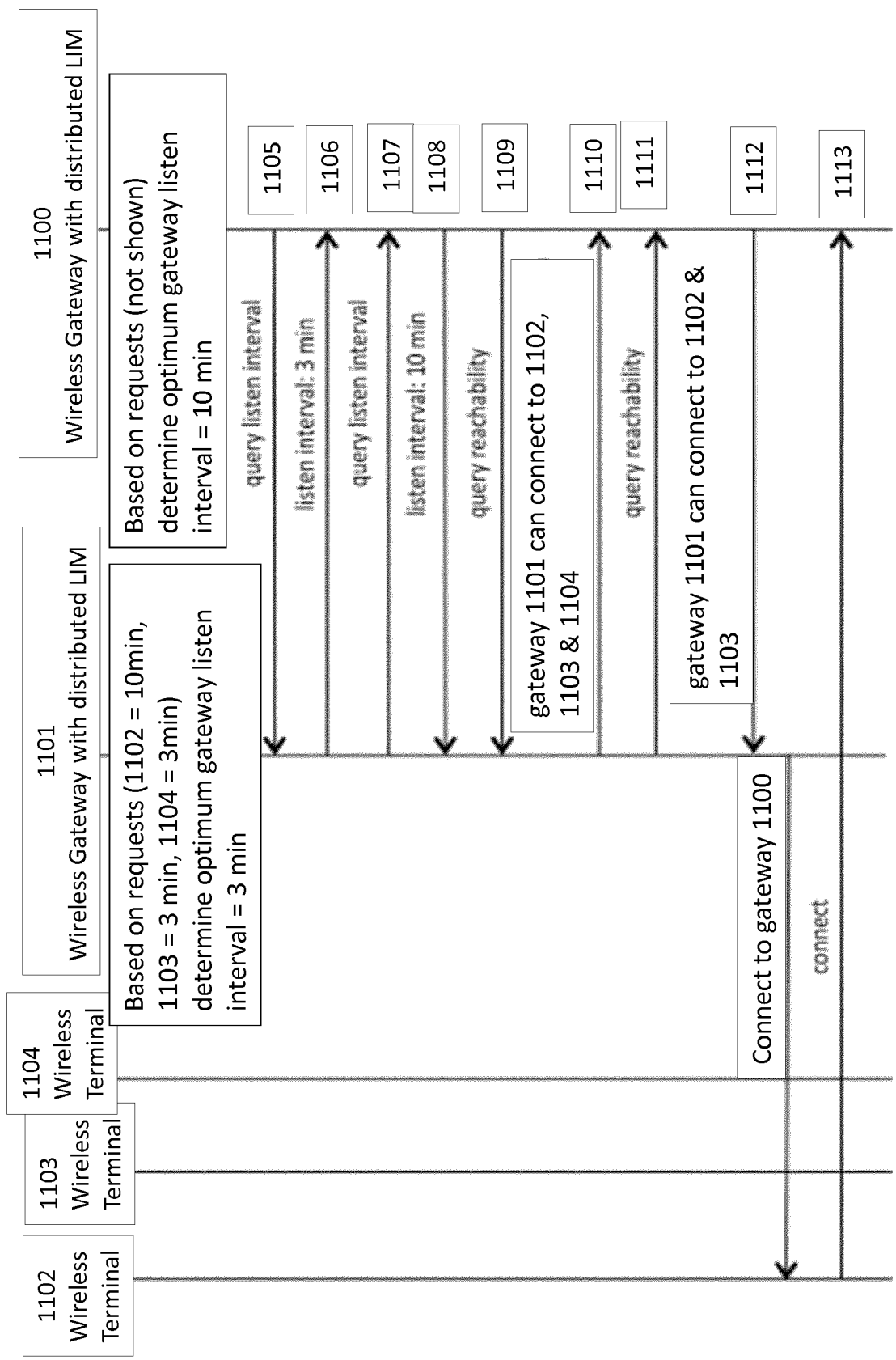
FIG. 11 shows an example signalling sequence according to another embodiment disclosed in the present application.

In some examples the control entity is a distributed function wherein each node in which the control entity function resides performs the steps of requesting the discontinuous reception information from the wireless terminals served by a given wireless gateway. An example signalling sequence is shown in FIG. 11 wherein a first wireless gateway 1100 incorporates a distributed LIM function which sends a requests 1105 to a second wireless gateway 1101 for an optimal listen interval for the wireless terminals served by the second wireless gateway. The second wireless gateway 1101 returns a response 1106 indicating an optimal listen interval of 3 min. In this example the second wireless gateway 1101 incorporates a distributed LIM function and sends a request 1107 to the first wireless gateway 1100 for an optimal listen interval for the wireless terminals served by the first wireless gateway 1100. In this example the first wireless gateway responds with a message 1108 indicating the optimal listen interval for wireless terminals served by the first wireless gateway 1100. In some examples the distributed LIM functions request connectivity information 1109, 1111 from other wireless gateways 1100, 1101 which return 1110, 1112 indications of which wireless terminals are within their reach, or serving area. In other examples distributed control entities obtain this information directly from the wireless terminals, via a management protocol such as LWM2M. In other examples distributed control entities obtain the information from another control entity or database. In the example depicted in FIG. 11 the distributed LIM function incorporated in the second wireless gateway 1101 determines that wireless terminal 1102 should be handed over to the first wireless gateway 1100 based on aligning the optimal listen interval of the wireless gateway (in this example 10 min) with the preferred listen interval capability of the wireless terminal. The embodiments described by FIGS. 9, 10 and 11 use the listen interval as an example of the DRX cycle parameters which may be reconfigured or aligned to produce an optimal common reception period. The procedures apply equally to the other DRX cycle parameters previously disclosed. In some examples the distributed LIM function or control entity is incorporated in a wireless terminal.

In some examples the control entity performs multiple processing iterations to determine the optimum configurations of wireless terminal DRX cycle parameters and wireless terminal to wireless gateway connections.

In some aspects of the disclosure the control entity obtains a discontinuous transmission schedule, or sleep periods, for the wireless gateways serving the wireless terminals. In some examples the control entity synchronizes the sleep schedules of the wireless terminals connected to a wireless gateway so that the sleep schedules of the wireless terminals are overlapping. This increases the amount of time that the gateway itself is able to sleep, or operate in a discontinuous reception. The solution therefore saves energy within the communications system by allowing the wireless terminals e.g. sensors and wireless gateways to sleep longer and still fulfill the requirements of the IoT use cases in terms of needed latency of a multicast or broadcast transmission.

In some examples the control entity arranges the sleep schedules of the wireless terminals connected to a gateway so that the awake times are overlapping. This helps in scheduling multicast/broadcast transmissions from the cloud or gateway by producing common time periods when all wireless terminals are awake, so that the wireless terminals are able to receive the multicast transmission without the need for buffering or reducing the amount of buffering needed.

Figure 12:
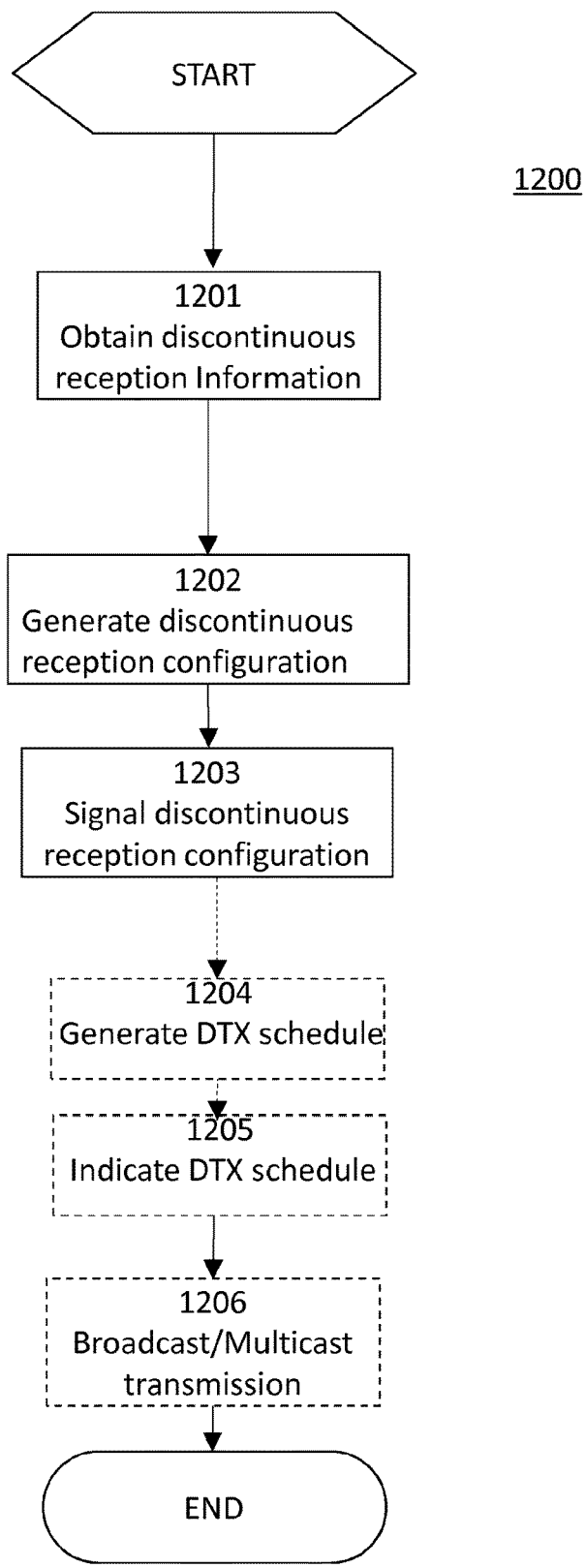
FIG. 12 is an exemplary flow chart according to an embodiment disclosed herein.

Methods of embodiments will now be described in detail in relation to the FIGS. 12 and 13. In FIG. 12 a method 1200 is shown for managing discontinuous reception periods for a plurality of wireless terminals in a control entity 101. In some examples a wireless terminal comprises one or more sensors, comprised in a sensor network. In some examples the plurality of wireless terminals are served by a plurality of wireless gateways. The method starts by obtaining 1201 discontinuous reception information for each of the plurality of wireless terminals. Based on the discontinuous reception information the method generates 1202 a discontinuous reception configuration for one or more of said wireless terminals to produce a common reception period. The discontinuous reception configuration is a period during which the plurality of wireless terminals are able to receive a data transmission at the same time. The method proceeds by signalling 1203 the discontinuous reception configuration for the one or more of said wireless terminals. In some examples this is signalled directly to the terminal, for example via a management protocol. In other examples this is signalled via another entity, for example via an AP or eNode B, which in other examples may use another protocol such as the MAC protocol to signal to the wireless terminal. In some embodiments the method further comprises generating 1204 a discontinuous transmission (DTX) schedule for the one or more wireless gateways such that the one or more wireless gateways can implement discontinuous receptions of operation which are synchronised with the listen intervals of the plurality of wireless terminals. In this example the method further comprises indicating 1205 the DTX schedule to the one or more wireless gateways. The method may further comprise the step of causing 1206 a broadcast or multicast transmission to the plurality of wireless terminals.

Figure 13:
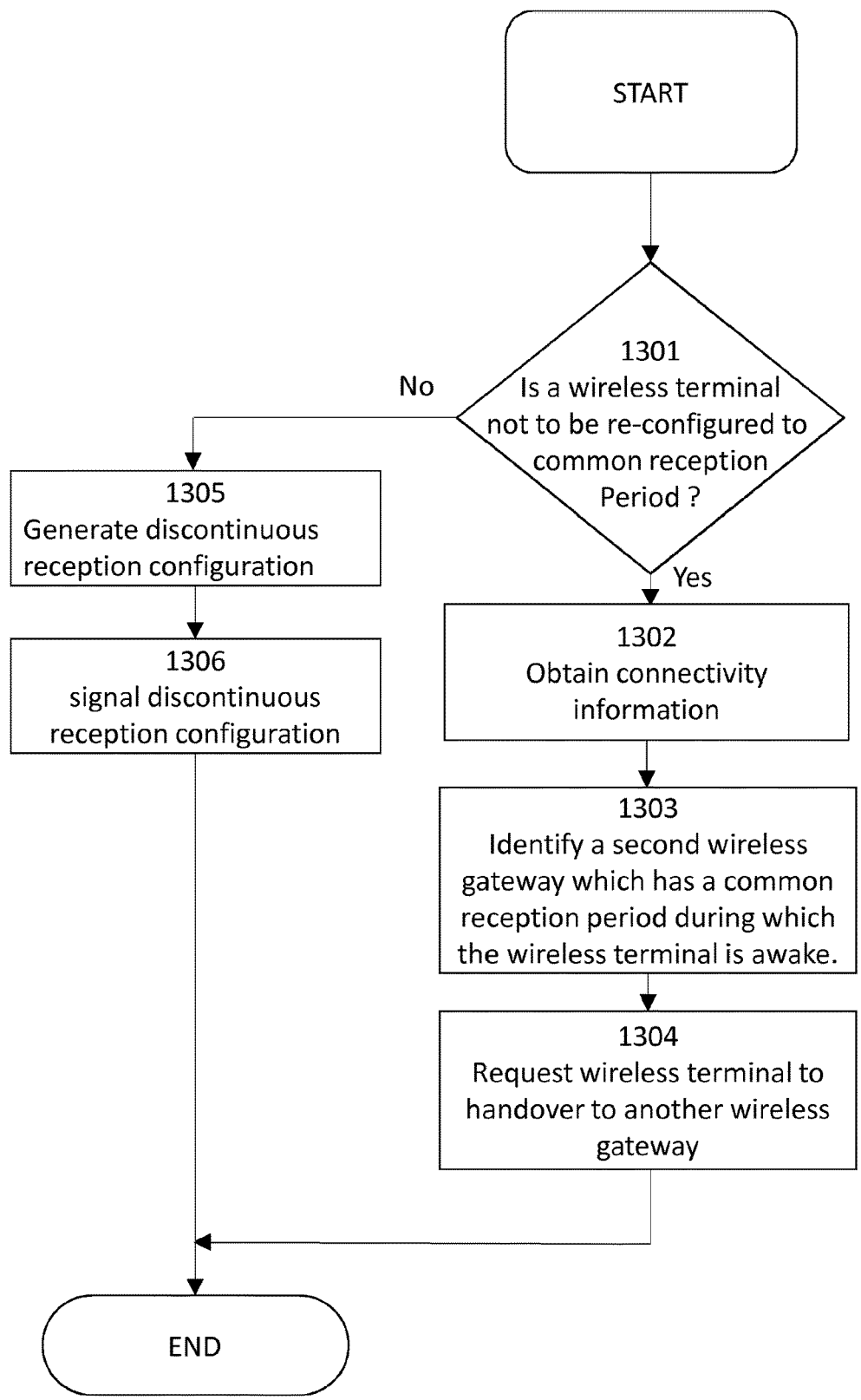
FIG. 13 shows a further exemplary flow chart according to a further embodiment disclosed herein.

FIG. 13 shows a further embodiment of the method 1200 comprising determining whether a wireless terminals is not to be reconfigured. In some examples the discontinuous reception information indicates that one or more of the parameters cannot be re-configured. In some examples the discontinuous reception information indicates certain value ranges for the parameters wherein the reconfiguration would cause the value for a certain parameter to be out of range. In other examples there is no optimal discontinuous reception configuration to derive a common reception period for all wireless terminals. The method comprises selecting 1301 a wireless terminal which is unable to receive a transmission during a first common reception period. The method further comprises obtaining 1302 connectivity information which comprises the wireless gateways the wireless terminal is able to connect to, i.e. are within range and identifying 1303 a second wireless gateway for which the wireless terminal is able to receive a transmission, i.e is awake, during a second common reception period associated with the second wireless gateway. The method further comprises initiating 1304 the wireless terminal to be handed over from a first wireless gateway to a second wireless gateway, wherein the second wireless gateway is a wireless gateway which is within range and with which the wireless terminal may connect. If the method determines that the wireless terminal is to be reconfigured the method generates 1305 discontinuous reception configuration parameters and signals 1306 the discontinuous reception configuration for the wireless terminal. In some examples the method comprises multiple iterations wherein the process repeats for the plurality of wireless terminals.

In some examples a control entity 101 determines a target discontinuous reception/discontinuous transmission configuration for each wireless gateway based on the preferred discontinuous reception information collected from the wireless terminals. The target discontinuous reception/discontinuous transmission configuration is selected to correspond to most popular discontinuous reception configuration among the wireless terminals. For example, in the determination, it is observed that a given listen interval also serves the wireless terminals with a preferred listen interval which is a multiple of the target listen interval. For example, wireless terminals with a preferred listen interval of 4 minutes can be served by a wireless gateway supporting a listen interval of 2 minutes. A wireless gateway can select the listen interval of 4 minutes to serve wireless terminals with listen intervals of 1, 2 and 4 minutes. In such a case, multicast transmission is scheduled when all wireless terminals are awake, i.e. with a 4 minute interval.

The wireless terminals with listen intervals that are not matching the listen interval of a gateway are, depending on their capabilities, either i) Commanded to change their listen interval to the evenly dividable fraction of the multicast interval that is within the range of the possible listen intervals of the wireless terminal; or ii) Commanded to switch to a neighboring wireless gateway that has a multicast interval that better matches the listen interval of the wireless terminal.

In some examples a control entity obtains the discontinuous reception information of the surrounding wireless gateways. In some examples the control entity is a cloud service and obtains the discontinuous reception information directly from the wireless gateways via management protocol. In other examples the discontinuous reception information is retrieved from another cloud based entity or repository. In some examples a control entity is distributed between the wireless gateways. The control entity in one wireless gateway may query other wireless gateways for their discontinuous reception information. The advantage of such embodiments is that the control entity has a full picture of the capabilities and configuration of the wireless gateways serving the plurality of wireless terminals enabling an optimal allocation of wireless terminals to wireless gateways to minimise the amount of buffering and delays in performing multicast or broadcast transmissions to the wireless terminals.

In some examples the control entity synchronizes the start of the DRX cycles so that all wireless terminals start listening at the same time. In some examples this is achieved by instructing a wireless gateway to temporarily reduce the times which it accepts when receiving a request for discontinuous reception and indicated listen intervals. For example, if the common listen interval is scheduled to start in 1 minute, the wireless gateway temporarily allows only 1 minute listen intervals, and reduces this time until the wireless terminals are synchronized.

Figure 14:
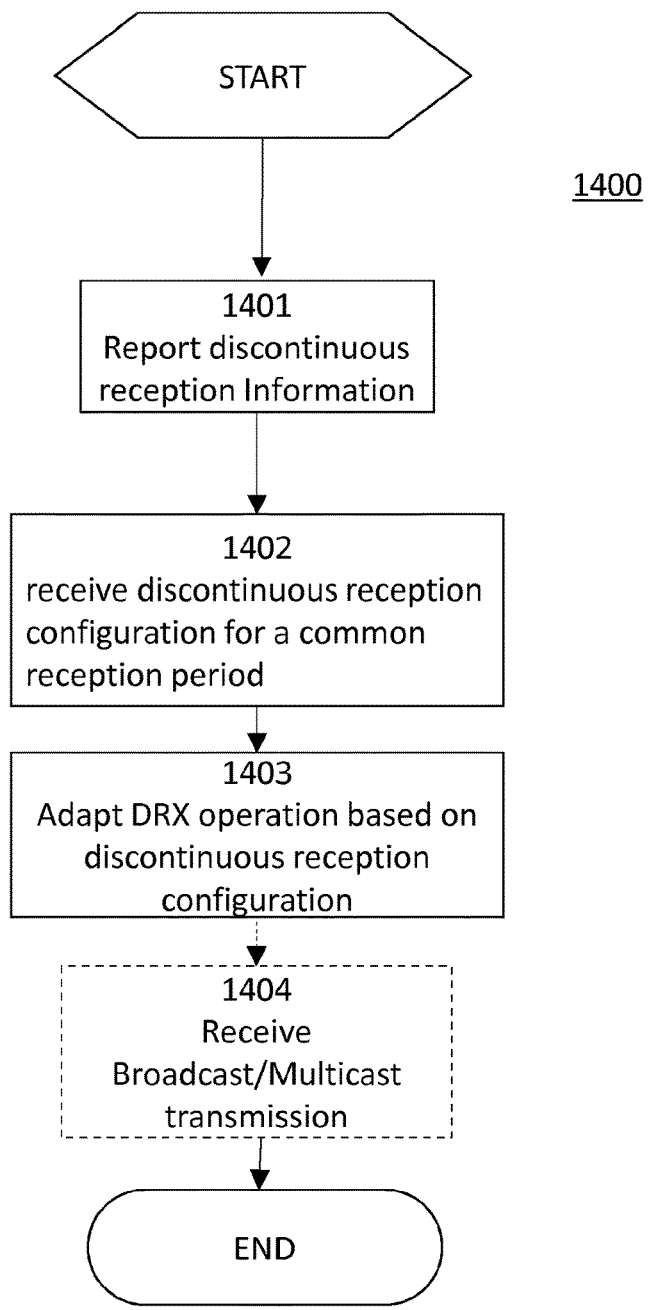
FIG. 14 shows a further exemplary flow chart according to a further embodiment disclosed herein.

FIG. 14 shows a method 1400 of discontinuous reception operation in a wireless terminal 104, 105, 106 in a communications system 100. The communications system comprises a plurality of wireless terminals. The method begins with the wireless terminal reporting 1401 discontinuous reception information. The wireless terminal may report this information to a control entity via a management protocol. In some examples the wireless terminal may report the information to another control entity such as a wireless gateway or a MME. The method continues with the wireless terminal receiving 1402 a discontinuous reception configuration wherein the discontinuous reception configuration produces a common reception period for the plurality of wireless terminals. The wireless terminal may receive the discontinuous reception configuration from a control entity via a management protocol. In other examples the wireless terminal may receive discontinuous reception configuration from another entity, for example an MME or a wireless gateway. The method continues with the wireless terminal adapting 1403 the discontinuous reception operation based on the received discontinuous reception configuration.

Figure 15:
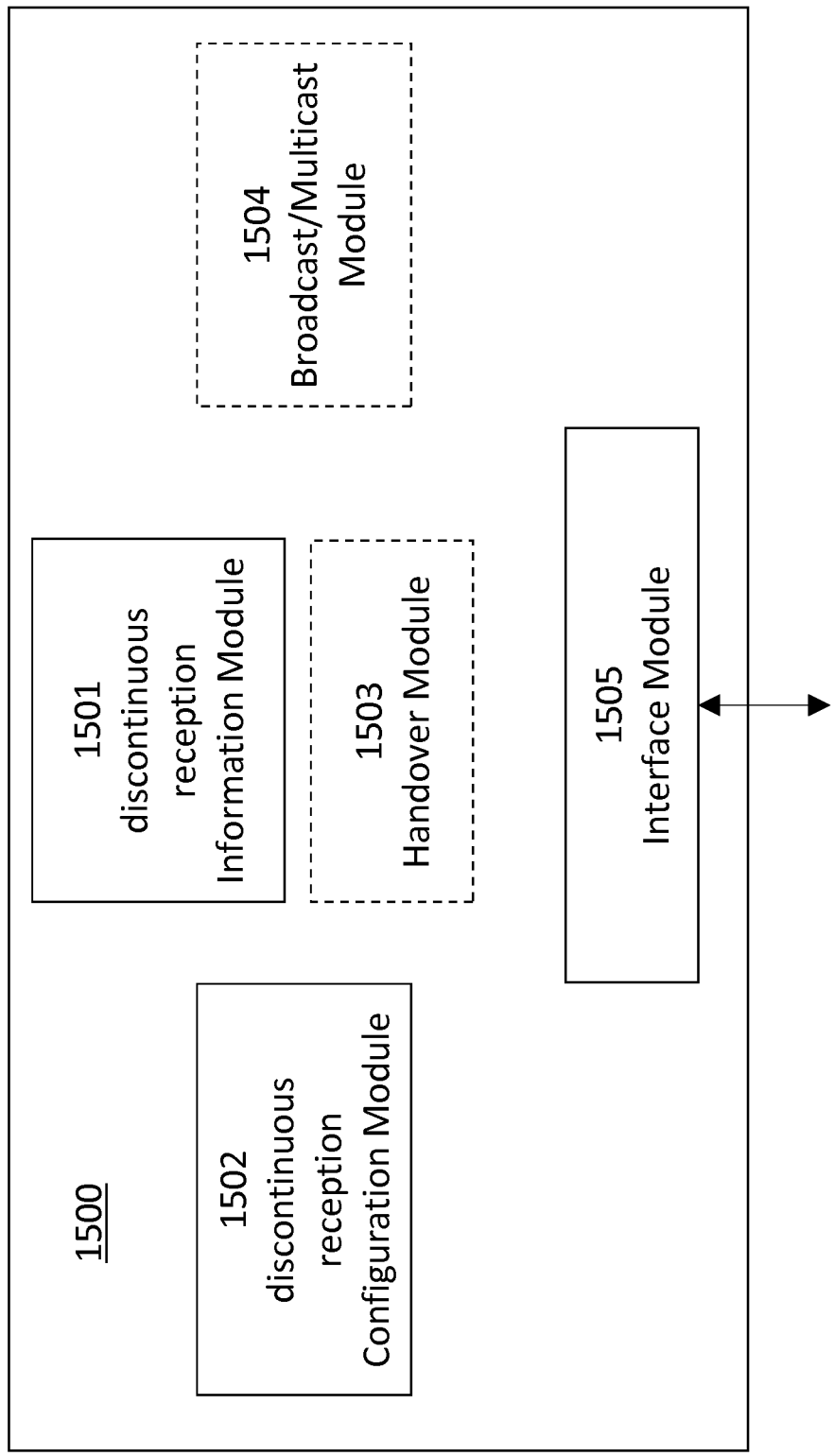
FIG. 15 shows an exemplary apparatus according to an embodiment disclosed herein.
Figure 16:
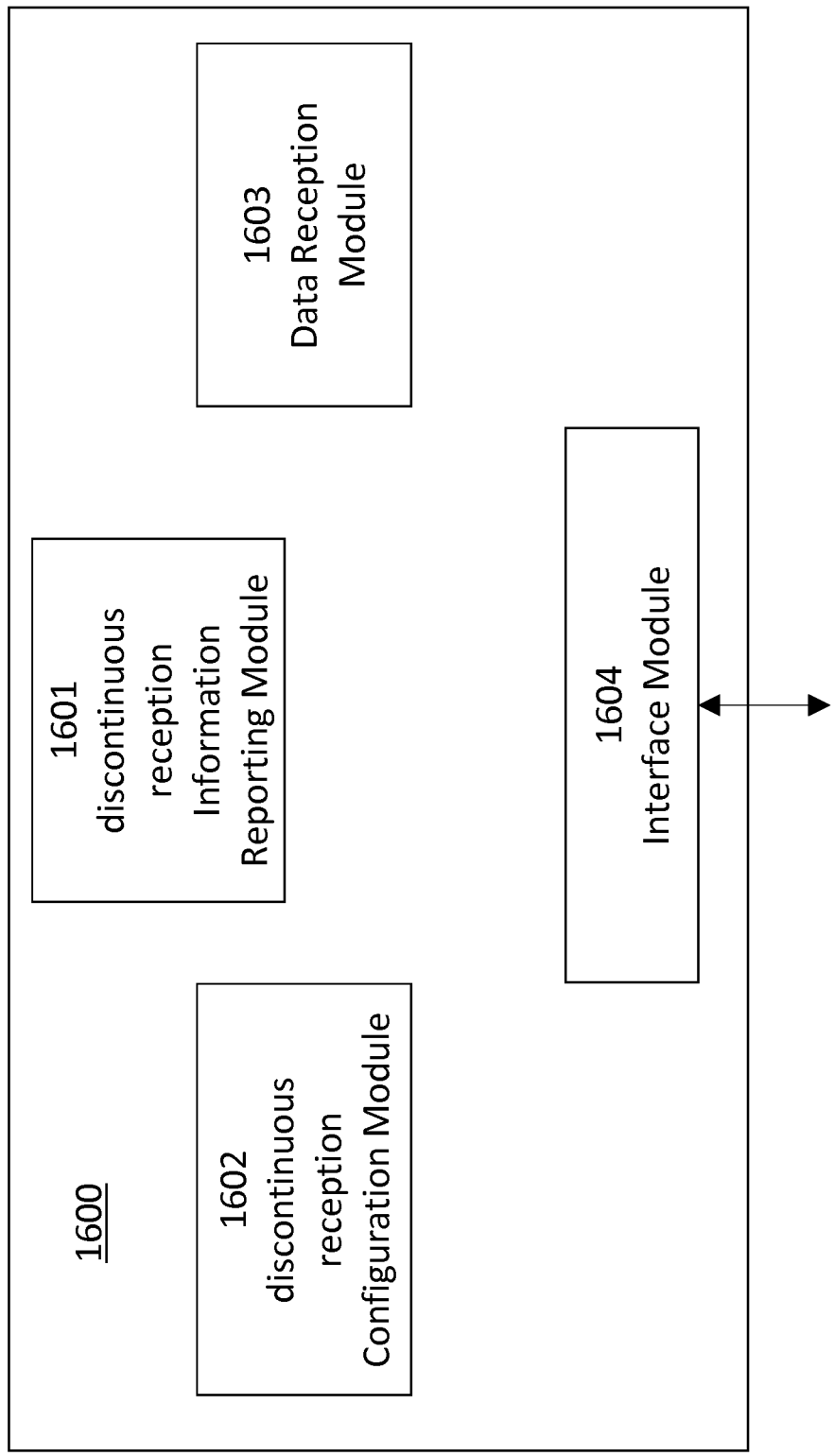
FIG. 16 shows a further exemplary apparatus according to a further embodiment disclosed herein.

FIGS. 15 and 16 illustrate functional units in embodiments of a control entity 1500 and a wireless terminal 1600, which may execute the methods described herein, for example according to computer readable instructions received from a computer program. It will be understood that the modules illustrated in FIGS. 15 and 16 may be software implemented functional units, and may be realised in any appropriate combination of software modules.

FIG. 15 provides an example control entity 1500 wherein the control entity comprises a discontinuous reception information module 1501 for obtaining discontinuous reception information for each of a plurality of wireless terminals. The discontinuous reception information module 1501 may be configured to receive the discontinuous reception information directly via a management protocol. The interface module 1505 may be configured to provide signalling between the control entity and wireless terminals, wireless gateways and other entities of the communications system. In some examples the interface module 1505 is configured to provide a management protocol interface, such as a LWM2M interface, to wireless terminals and/or wireless gateways. The control entity 1500 includes a discontinuous reception configuration module 1502 arranged to generate, based on the obtained discontinuous reception information, a discontinuous reception configuration for one or more of said wireless terminals to produce a common reception period. The common reception period being a period during which the plurality of wireless terminals are able to receive a data transmission at the same time. The control entity 1500 optionally includes a Broadcast/Multicast module 1504 configured to trigger a broadcast or multicast transmission for the plurality of wireless terminals. In some examples the Broadcast/Multicast module 1504 is configured to cause, via the interface module 1505, a broadcast or multicast transmission to the plurality of devices during the common reception period. In some examples the Broadcast/Multicast module indicates the common reception period for the broadcast or multicast transmission to another entity. In some examples the Broadcast/Multicast module 1504 performs the transmission itself. In some embodiments the control entity 1500 includes a Handover Module 1503 configured to obtain the connectivity information of wireless terminals to wireless gateways. The Handover Module 1503 may interact with the discontinuous reception information module 1501 to determine if another wireless gateway is within range and can be connected to a wireless terminal and would enable the discontinuous reception information module 1501 to derive a common reception period for wireless terminals served by a first wireless gateway if one or more wireless terminals are handed over to a second wireless gateway. The Handover Module 1503 is configured to select a wireless terminal which is unable to receive a transmission during a first common reception period associated to a first wireless gateway. The Handover Module 1503 is further configured to obtain connectivity information for said wireless terminal. The connectivity information identifies one or more wireless gateway to which the wireless terminal can connect, i.e. is within range. The Handover Module 1503 is further configured to identify a second wireless gateway for which the wireless terminal is able to receive a transmission during a second common reception period associated with the second wireless gateway and initiate a handover of a wireless terminal from the first wireless gateway to the second wireless gateway. In some examples the Handover Module 1503 initiates the handover via management protocol message sent from the Interface Module 1505 directly to the wireless terminal. In other examples the Handover Module 1503 triggers the handover though an indication to another entity, for example a wireless gateway or a Mobility Management Entity.

FIG. 16 provides an example wireless terminal 1600 wherein the wireless terminal comprises a discontinuous reception information reporting module 1601 for reporting discontinuous reception information, via an interface module 1604. The wireless terminal 1600 includes a discontinuous reception configuration module 1602 for receiving, via the interface module 1604, a discontinuous reception configuration wherein the discontinuous reception configuration produces a common reception period for the plurality of wireless terminals and adapting the discontinuous reception operation based on the received discontinuous reception configuration. The wireless terminal 1600 may comprise a data reception module 1603 for receiving a multicast or broadcast transmission during the common reception period.

Figure 17:
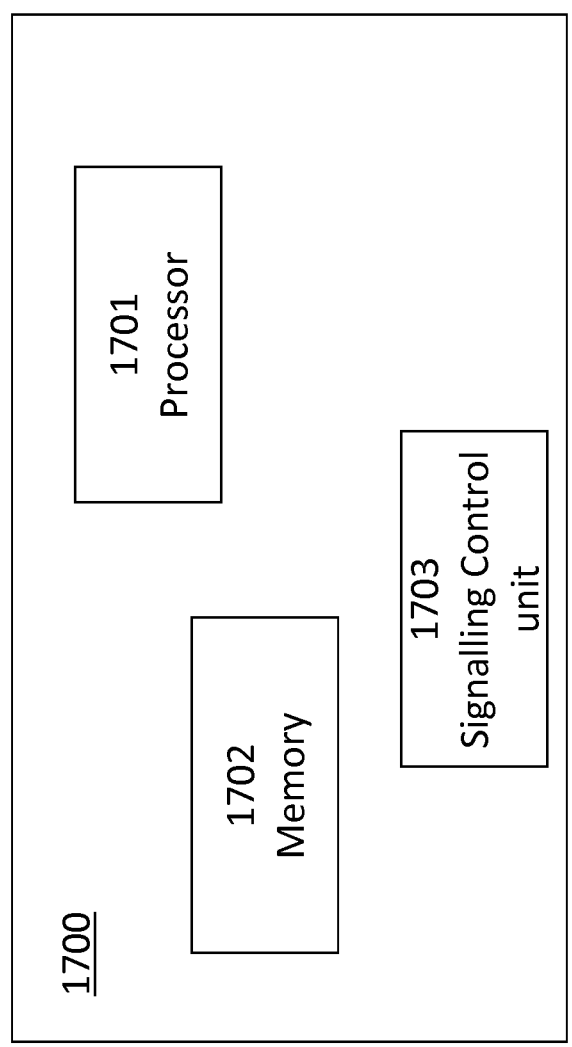
FIG. 17 shows a further exemplary apparatus according to a further embodiment disclosed herein.
Figure 18:
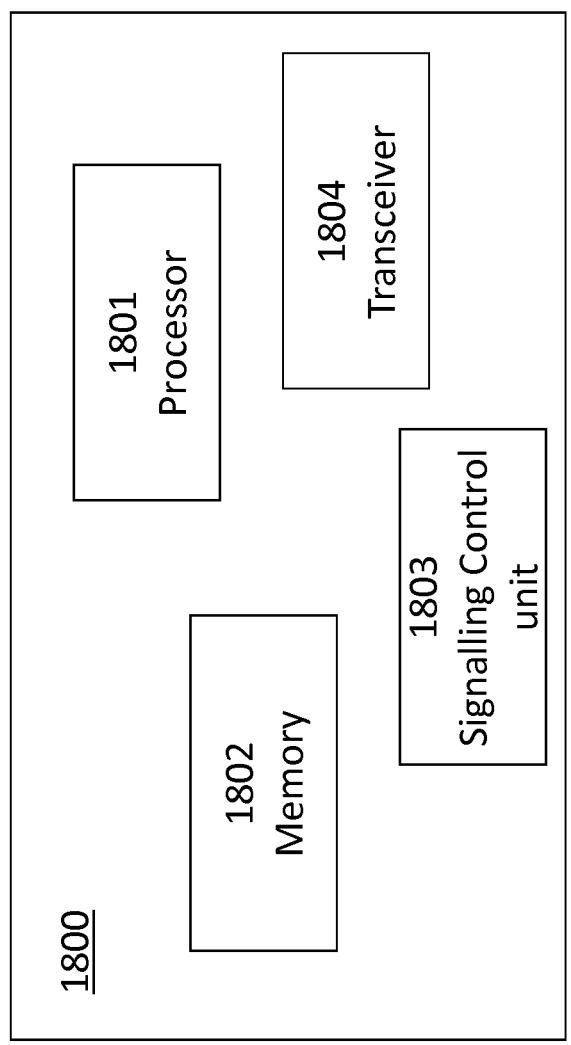
FIG. 18 shows a further exemplary apparatus according to a further embodiment disclosed herein.
Figure 19:
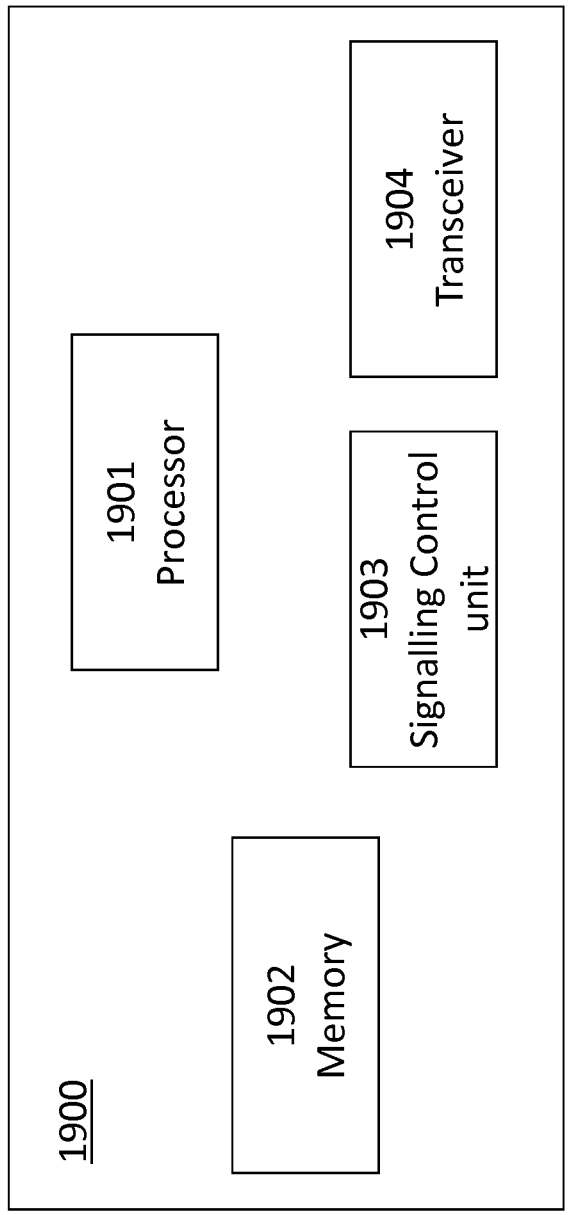
FIG. 19 shows a further exemplary apparatus according to a further embodiment disclosed herein.

FIGS. 17, 18 and 19 show a control entity 1700, a wireless terminal 1800, and a wireless gateway 1900, respectively, that can be adapted or configured to operate according to one or more of the non-limiting example embodiments described.

In FIG. 17 a control entity 1700 comprises a processor or processing unit 1701 that controls the operation of the control entity 1700. The processing unit 1701 is connected to a signalling control unit 1703 which may include an interface to the other entities in the communications system, for example an ethernet port providing IP connectivity. The signalling control unit 1703 is used to transmit signals to and receive signals from one or more other entities in the communications system. The control entity 1700 also comprises a memory or memory unit 1702 that is connected to the processing unit 1701 and that contains instructions or computer code executable by the processing unit 1701 and other information or data required for the operation of the control entity in accordance with the methods described herein.

In FIG. 18 a wireless terminal 1800 comprises a processor or processing unit 1801 that controls the operation of the wireless terminal 1800. The processing unit 1801 is connected to a signalling control unit 1803 which includes an interface to a transceiver or transceiver unit 1804. The transceiver unit 1804 includes one or more antenna. The signalling control unit 1803, via the transceiver unit 1804, is used to transmit signals to and receive signals from wireless gateways and other wireless terminals in the communications system. The wireless terminal 1800 also comprises a memory or memory unit 1802 that is connected to the processing unit 1801 and that contains instructions or computer code executable by the processing unit 1801 and other information or data required for the operation of the wireless terminal in accordance with the methods described herein.

In FIG. 19 a wireless gateway 1900 comprises a processor or processing unit 1901 that controls the operation of the wireless gateway 1900. The processing unit 1901 is connected to a signalling control unit 1903 which includes an interface to a transceiver or transceiver unit 1904. The transceiver unit 1904 includes one or more antenna. The signalling control unit 1903, via the transceiver unit 1904, is used to transmit signals to and receive signals from wireless terminals in the communications system. The wireless gateway 1900 also comprises a memory or memory unit 1902 that is connected to the processing unit 1901 and that contains instructions or computer code executable by the processing unit 1901 and other information or data required for the operation of the wireless gateway in accordance with the methods described herein.

An aspect provides a computer program for managing a discontinuous reception operation, the computer program comprising computer code which, when run on processing circuitry of a control entity 1700, wireless terminal 1800, or wireless gateway 1900 in a communications system, causes the control entity 1700, wireless terminal 1800 or wireless gateway 1900 perform methods as described herein pertaining to the control entity 1700, wireless terminal 1800 and wireless gateway 1900, respectively.

A further aspect of the disclosure provides a carrier containing a computer program comprising instructions which, when executed on at least one processor, cause the at least one processor to carry out the method according to any example.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

ABBREVIATIONS

3GPP 3rd Generation Partnership Project
LIM Listening Interval Manager
LTE Long term evolution
MAC Medium Access Control
MTC Machine Type Communication
NAS Non-Access Stratum
RRC Radio Resource Control
STA Station
UE User Equipment

The invention claimed is:

1. A method for managing discontinuous reception operation in a communications system wherein the communications system comprises a plurality of wireless terminals each supporting a discontinuous reception operation wherein each wireless terminal discontinuously receives data transmissions, the method comprising:
   obtaining discontinuous reception information from each of said wireless terminals wherein the discontinuous reception information of each wireless terminal comprises one or more of: a reception period, a sleep period, a DRX cycle, and a DRX cycle start period associated with that wireless terminal;
   generating, based on the obtained discontinuous reception information from each wireless terminal, a discontinuous reception configuration for one or more of said wireless terminals to produce a common reception period for each wireless terminal, such that even when there is no common period between the plurality of wireless terminals during which each of the plurality of wireless terminals can receive a data transmission, reception periods of one or more of the plurality of wireless terminals are aliened to produce the common reception period, wherein the common reception period is a period during which the plurality of wireless terminals are able to receive a data transmission at the same time; and the discontinuous reception configuration comprises modifying one or more of the reception period, the sleep period, the DRX cycle, and the DRX cycle start period of each wireless terminal; and
signaling the discontinuous reception configuration to the one or more wireless terminals to produce the common reception for each wireless terminal.

2. The method of claim 1 further comprising causing a multicast or broadcast transmission to the plurality of wireless terminals during the common reception period.

3. The method as claimed in claim 1 wherein the discontinuous reception information comprises an indication whether one or more of a reception period, a sleep period, a DRX cycle, and a DRX cycle start period can be modified.

4. The method as claimed in claim 1 wherein the plurality of wireless terminals are served by multiple wireless gateways wherein one or more of the wireless gateways comprise different radio access technology.

5. The method as claimed in claim 1 wherein the obtaining discontinuous reception information and/or signaling discontinuous reception configuration is performed by a management control protocol comprising Light Weight Machine to Machine (LWM2M) signaling.

6. The method as claimed in claim 1 wherein one or more wireless gateways support discontinuous transmission, the method further comprising:
generating a discontinuous transmission, DTX, schedule for each of said one or more wireless gateways wherein the discontinuous transmission schedule is synchronized with the common reception period; and
indicating the DTX schedule to the one or more wireless gateways.

7. The method as claimed in claim 1 further comprising:
selecting a wireless terminal which is unable to receive a transmission during a first common reception period associated with a first wireless gateway;
obtaining connectivity information for said wireless terminal, wherein the connectivity information identifies one or more wireless gateway to which the wireless terminal can connect;
identifying a second wireless gateway for which the wireless terminal is able to receive a transmission during a second common reception period associated with the second wireless gateway;
initiating a handover of said wireless terminal from the first wireless gateway to the second wireless gateway.

8. A control entity for use in a communications system wherein the communications system comprises a plurality of wireless terminals each supporting a discontinuous reception operation wherein each wireless terminal discontinuously receives data transmissions, wherein the control entity is configured to:
obtain discontinuous reception information from each of said wireless terminals wherein the discontinuous reception information of each wireless terminal comprises one or more of a reception period, a sleep period, a DRX cycle, and a DRX cycle start period associated with that wireless terminal;
generate, based on the obtained discontinuous reception information from each wireless terminal, a discontinuous reception configuration for one or more of said wireless terminals to produce a common reception period for each wireless terminal, such that even when there is no common period between the plurality of wireless terminals during which each of the plurality of wireless terminals can receive a data transmission, reception periods of one or more of the plurality of wireless terminals are aliened to produce the common reception period, wherein the common reception period is a period during which the plurality of wireless terminals are able to receive a data transmission at the same time and the discontinuous reception configuration comprises modifying one or more of the reception period, the sleep period, the DRX cycle, and the DRX cycle start period of each wireless terminal; and
signal the discontinuous reception configuration to the one or more wireless terminals to produce the common reception period for each wireless terminal.

9. The control entity of claim 8 further configured to cause a multicast or broadcast transmission to the plurality of wireless terminals during the common reception period.

10. The control entity as claimed in claim 8 wherein the discontinuous reception information comprises an indication whether one or more of a reception period, a sleep period, a DRX cycle, and a DRX cycle start period can be modified.

11. The control entity as claimed in claim 8 wherein the plurality of wireless terminals are served by multiple wireless gateways wherein one or more of the wireless gateways comprise different radio access technology.

12. The control entity as claimed in claim 8 wherein the control entity is configured to obtain discontinuous reception information and/or signal discontinuous reception configuration using a management control protocol comprising Light Weight Machine to Machine (LWM2M) signaling.

13. The control entity as claimed in claim 8 wherein a wireless gateway supports discontinuous transmission and the control entity is further configured to:
generate a discontinuous transmission schedule for each of wireless gateways wherein the discontinuous transmission schedule is synchronized with the common reception period; and
indicate the DTX schedule to one or more wireless gateways.

14. The control entity as claimed in claim 8 wherein the control entity is further configured to:
select a wireless terminal which is unable to receive a transmission during a first common reception period associated with a first wireless gateway;
obtain connectivity information for said wireless terminal, wherein the connectivity information identifies one or more wireless gateway to which the wireless terminal can connect;
identify a second wireless gateway for which the wireless terminal is able to receive a transmission during a second common reception period associated with the second wireless gateway; and
initiate a handover of said wireless terminal from the first wireless gateway to the second wireless gateway.

15. The control entity as claimed in claim 8, wherein the control entity is further configured to cause a transmission of a multicast or broadcast transmission to the plurality of wireless terminals during a first common reception period and a second common reception period.

16. A method of discontinuous reception operation in each wireless terminal in a communications system, wherein the communications system comprises a plurality of wireless terminals, the method, in each wireless terminal, comprising:
reporting discontinuous reception information, wherein the discontinuous reception information comprises one or more of: a reception period, a sleep period, a DRX cycle, and a DRX cycle start period associated with that wireless terminal;
receiving a discontinuous reception configuration wherein the discontinuous reception information of each wireless terminal is used generate the discontinuous reception configuration, the discontinuous reception configuration produces a common reception period for each wireless terminal in the plurality of wireless terminals such that even when there is no common period between the plurality of wireless terminals during which each of the plurality of wireless terminals can receive a data transmission, reception periods of one or more of the plurality of wireless terminals are aliened to produce the common reception period, and the discontinuous reception configuration comprises modifying one or more of the reception period, the sleep period, the DRX cycle, and the DRX cycle start period of each wireless terminal; and adapting the discontinuous reception operation based on the received discontinuous reception configuration.

17. The method according to claim 16 further comprising receiving a multicast or broadcast transmission during a reception period according to the received discontinuous reception configuration.

18. The method according to claim 16 wherein the discontinuous reception information comprises an indication whether one or more of a reception period, a sleep period, a DRX cycle, and a DRX cycle start period can be modified.

19. The method according to claim 16 wherein the reporting discontinuous reception information and/or receiving discontinuous reception configuration is performed using a management control protocol comprising Light Weight Machine to Machine (LWM2M) protocol.

20. A plurality of wireless terminals for use in a communications system, wherein each wireless terminal is configured to support a discontinuous reception operation, each wireless terminal is further configured to:

report discontinuous reception information, wherein the discontinuous reception information comprises one or more of: a reception period, a sleep period, a DRX cycle, and a DRX cycle start period associated with that wireless terminal;

receive a discontinuous reception configuration wherein the discontinuous reception information of each wireless terminal is used to generate the discontinuous reception configuration, the discontinuous reception configuration produces a common reception period for each wireless terminal in the plurality of wireless terminals such that even when there is no common period between the plurality of wireless terminals during which each of the plurality of wireless terminals can receive a data transmission, reception periods of one or more of the plurality of wireless terminals are aliened to produce the common reception period, and the discontinuous reception configuration comprises modifying one or more of the reception period, the sleep period, the DRX cycle, and the DRX cycle start period of each wireless terminal; and adapt the discontinuous reception operation based on the received discontinuous reception configuration.

21. The plurality of wireless terminals of claim 20, wherein each wireless terminal is further configured to receive a multicast or broadcast transmission during a reception period according to the received discontinuous reception configuration.

22. The plurality of wireless terminals of claim 20, wherein the discontinuous reception information comprises an indication whether one or more of a reception period, a sleep period, a DRX cycle, and a DRX cycle start period can be modified.

23. The plurality of wireless terminals of claim 20, wherein each wireless terminal is further configured to report discontinuous reception information and/or receive discontinuous reception configuration using a management control protocol comprising Light Weight Machine to Machine (LWM2M) signaling.

* * * * *